US012623398B2

(12) United States Patent
Garg et al.

(10) Patent No.: US 12,623,398 B2
(45) Date of Patent: May 12, 2026

(54) FREEFORM FABRICATION OF THREE-DIMENSIONAL STRUCTURES USING A DROPLET-ON-DEMAND PROCESS WITH CONTINUOUS AND FREQUENCY MODULATED MATERIAL DEPOSITION

(71) Applicant: Carnegie Mellon University, Pittsburgh, PA (US)

(72) Inventors: Akash Garg, Pittsburgh, PA (US); O. Burak Ozdoganlar, Sewickley, PA (US); Philip R. LeDuc, Wexford, PA (US); Saigopalakrishna Saileelaprasad Yerneni, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/686,058

(22) PCT Filed: Aug. 25, 2022

(86) PCT No.: PCT/US2022/041539
§ 371 (c)(1),
(2) Date: Feb. 23, 2024

(87) PCT Pub. No.: WO2023/028241
PCT Pub. Date: Mar. 2, 2023

(65) Prior Publication Data
US 2024/0367369 A1    Nov. 7, 2024

Related U.S. Application Data

(60) Provisional application No. 63/237,277, filed on Aug. 26, 2021.

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/268* (2017.08);
(Continued)

(58) Field of Classification Search
CPC ... B29C 64/112; B29C 64/209; B29C 64/268; B29C 39/26; B29C 33/52; B29C 39/02;
(Continued)

(56) References Cited

U.S. PATENT DOCUMENTS

2017/0320263 A1* 11/2017 Guillemot ............. B29C 64/112
2019/0336649 A1   11/2019 Beduer et al.
(Continued)

FOREIGN PATENT DOCUMENTS

CN         107361880 B      1/2019

OTHER PUBLICATIONS

Zheng , F., et al. (2020), Inkjet printing-based fabrication of microscale 3D ice structures, Microsystems & Nanoengineering, 6:89,pp. 1-10, from IDS (Year: 2020).*
(Continued)

*Primary Examiner* — Rebecca Janssen
(74) *Attorney, Agent, or Firm* — The Webb Law Firm

(57) ABSTRACT

A method of forming a three-dimensional structure using droplet-based freeform printing is provided. The method includes depositing a structural material through one or more nozzles onto a surface of a substrate by droplet-based freeform printing, such as inkjet printing, to form one or more three-dimensional structures including a smooth surface and one or more cross-sectional dimensions. The structural material undergoes a liquid-to-solid transition after deposition of the structural material, and the one or more cross-sectional dimensions are controlled by a droplet ejection frequency. A method of fabricating a matrix including a three-dimensional structure including forming a negative
(Continued)

three-dimensional template using droplet-based freeform printing, depositing, such as casting, a matrix material over the negative three-dimensional template and at least a portion of the surface of the substrate and solidifying the matrix material to form a matrix including the one or more three-dimensional structures of the negative template is also provided.

22 Claims, 13 Drawing Sheets

(51) Int. Cl.

| | |
|---|---|
| *B29C 64/268* | (2017.01) |
| *B33Y 10/00* | (2015.01) |
| *B29L 31/00* | (2006.01) |
| *B33Y 80/00* | (2015.01) |

(52) U.S. Cl.
CPC ....... *B29L 2031/7534* (2013.01); *B33Y 10/00* (2014.12); *B33Y 80/00* (2014.12)

(58) Field of Classification Search
CPC . B29C 64/40; B29L 2031/7534; B33Y 10/00; B33Y 80/00; B33Y 40/20; B22F 1/054; B22F 10/22
See application file for complete search history.

(56) References Cited

U.S. PATENT DOCUMENTS

| | | | |
|---|---|---|---|
| 2021/0122092 A1 | 4/2021 | Weiss et al. | |
| 2022/0032550 A1* | 2/2022 | Mantell | B33Y 80/00 |

OTHER PUBLICATIONS

A. Gannarapu and B. A. Gozen, "Freeze-Printing of Liquid Metal Alloys for Manufacturing of 3D, Conductive, and Flexible Networks," Adv. Mater. Technol. (Year: 2016).*
Wang et al., Freestanding hierarchical vascular structures engineered from ice, Biomaterials 192 (2019) 334-345 (Year: 2019).*
Zhang et al., Additive-free MXene inks and direct printing of micro-supercapacitors, Nature Communications, (2019) 10:1795 (Year: 2019).*
Garg et al., "Freeform 3D Ice Printing (3D-ICE) at the Micro Scale", Adv. Sci., 2019, pp. 1-11, vol. 2201566.
Wang et al., "Freestanding hierarchical vascular structures engineered from ice", Biomaterials, 2018, pp. 334-345, vol. 192.
Zheng et al., "Fabrication of 3D micro ice structures based on inkjet printing", 2019 IEEE 32nd International Conference on Micro Electro Mechanical Systems (MEMS), 2019, pp. 368-371.
Zheng et al., "Inkjet printing-based fabrication of microscale 3D ice structures", Microsystems & Nanoengineering, 2020, pp. 1-10, vol. 6, No. 89.

* cited by examiner

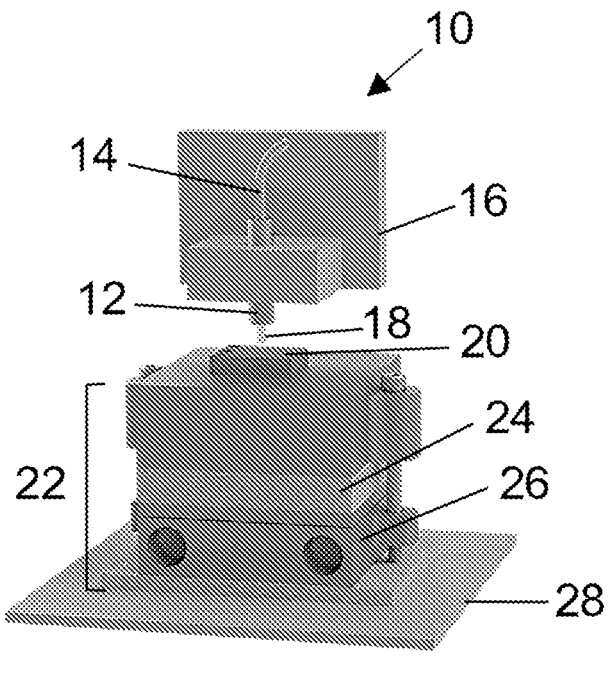
FIG. 1
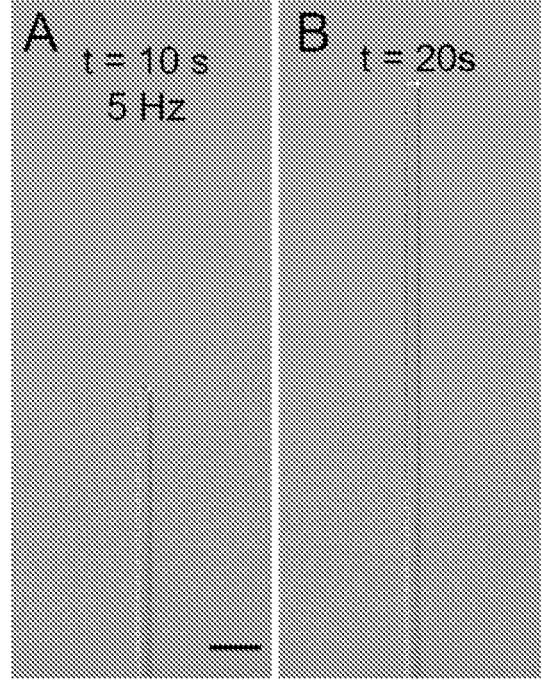
FIG. 2
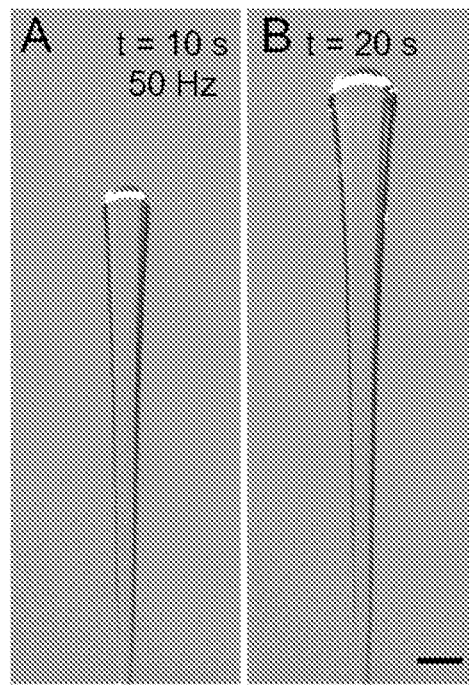
FIG. 3A
FIG. 3B

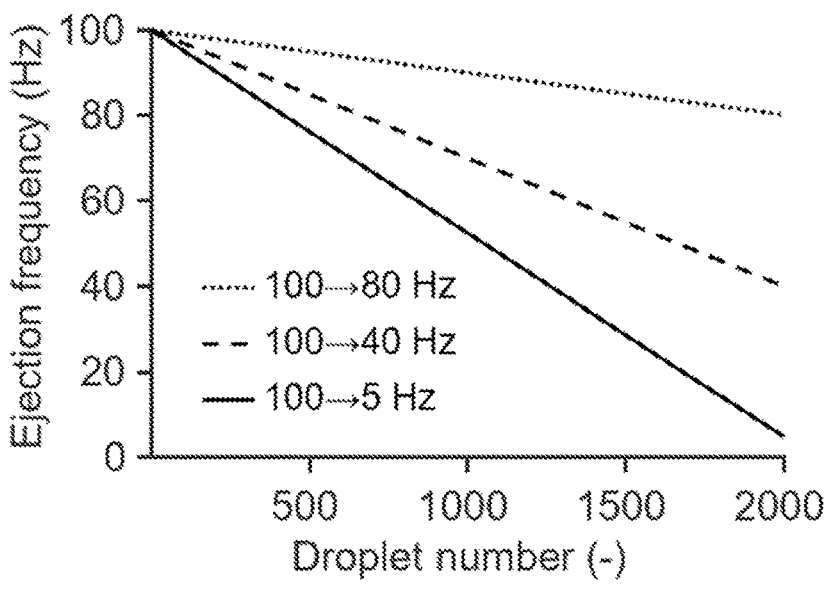
FIG. 3H
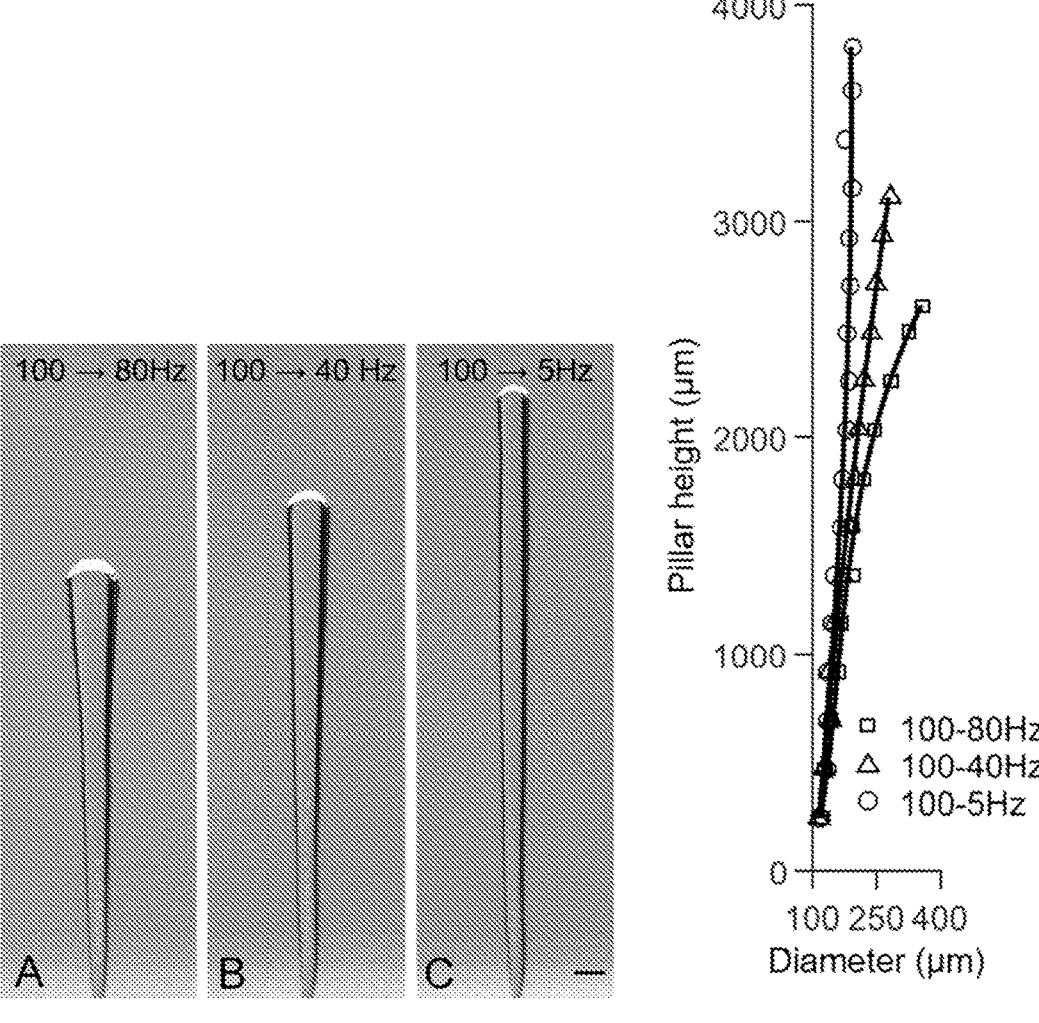
FIG. 3I                                                    FIG. 3J

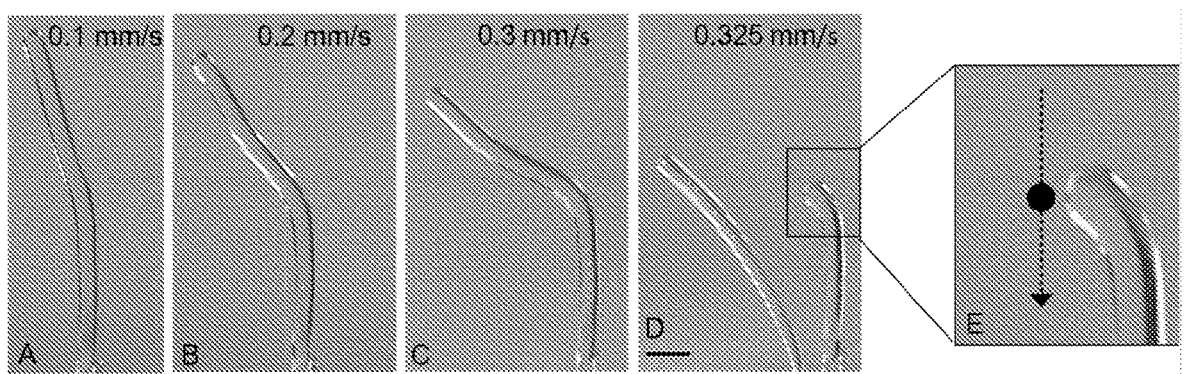
FIG. 4A
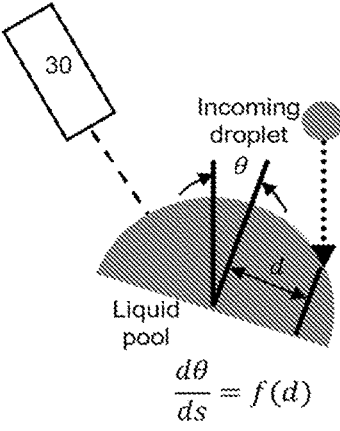
FIG. 4B
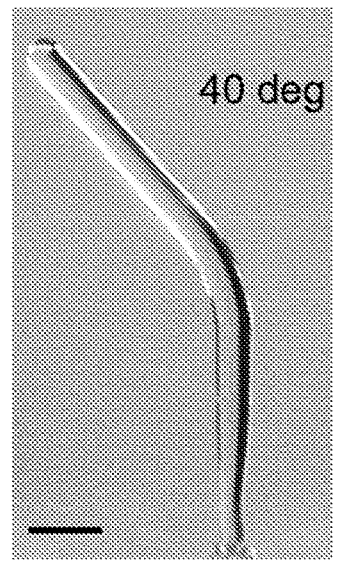 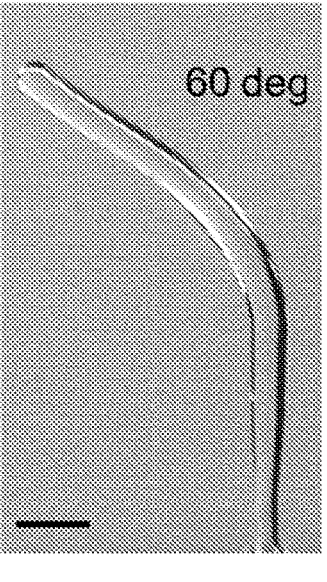 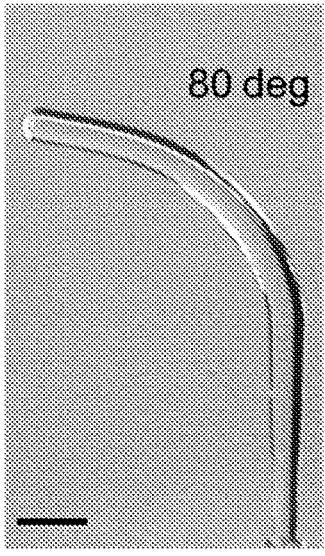
FIG. 4C                    FIG. 4D                    FIG. 4E

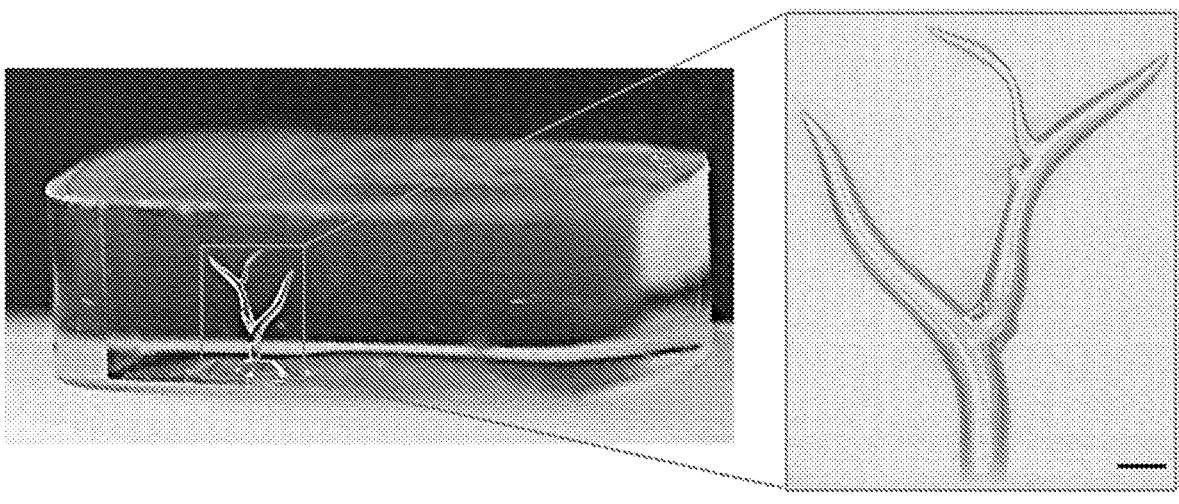
FIG. 6C
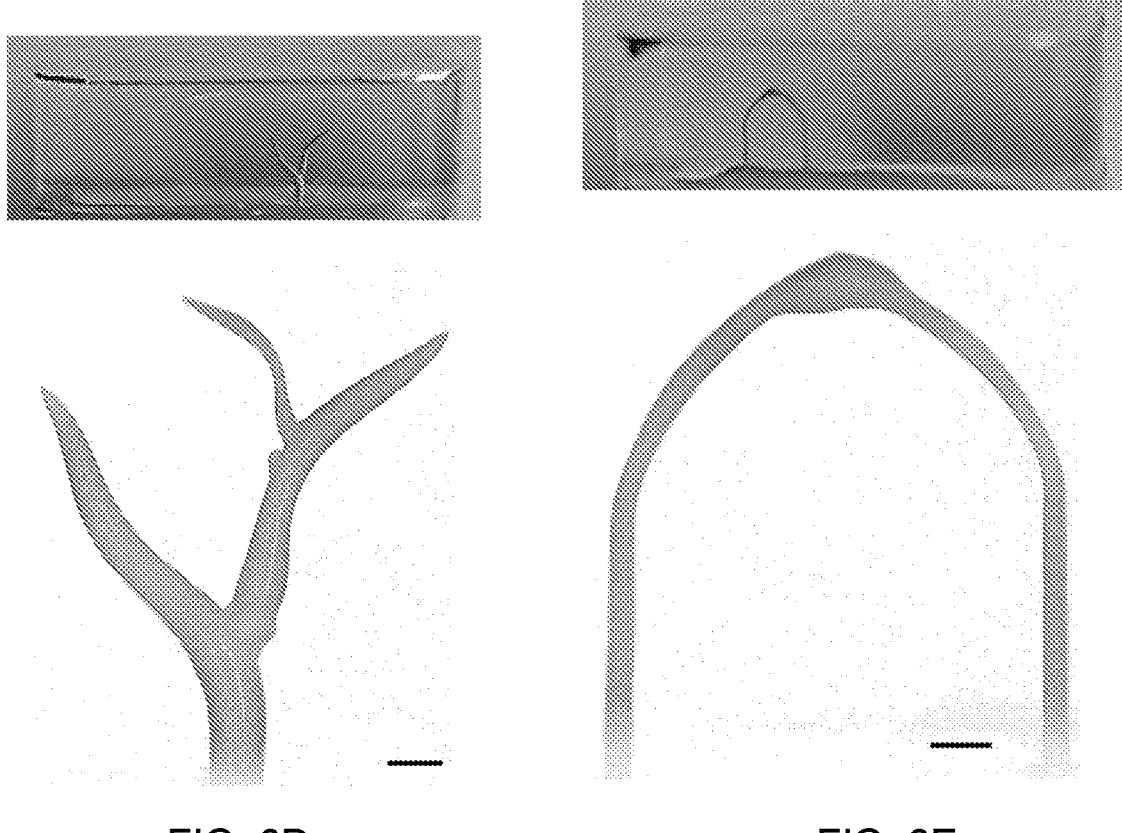
FIG. 6D                    FIG. 6E

1. Print vasculature template with ice

2. Immerse template in pre-chilled collagen

3. Lyophilize the construct to sublimate out the water

4. Crosslink, seed cells and perfuse culture medium

1

FREEFORM FABRICATION OF THREE-DIMENSIONAL STRUCTURES USING A DROPLET-ON-DEMAND PROCESS WITH CONTINUOUS AND FREQUENCY MODULATED MATERIAL DEPOSITION

CROSS REFERENCE TO RELATED APPLICATIONS

This application is the United States national phase of International Application No. PCT/US22/41539 filed Aug. 25, 2022, and claims priority to U.S. Provisional Patent Application No. 63/237,277, filed Aug. 26, 2021, the disclosures of which are hereby incorporated by reference in their entireties.

GOVERNMENT LICENSE RIGHTS

This invention was made with United States government support under AR081052 awarded by the National Institutes of Health, FA9550-18-1-0262 awarded by the Air Force Office of Scientific Research, and N00014-17-1-2566 awarded by the Office of Naval Research. The U.S. government has certain rights in the invention.

BACKGROUND OF THE INVENTION

Traditional three-dimensional printing processes involve the layer-by-layer printing of a positive geometry. In fabricating a range of complex geometries, this layer-by-layer three-dimensional (3D) printing process becomes time consuming, necessitate support structures that need to be removed after printing, and produce non-smooth, striated surfaces that require subsequent finishing processes. Furthermore, this layer-by-layer approach becomes inefficient at printing solid forms with intricate channel-like features or voids within a larger solid matrix, such as those encountered in vascularized engineered tissue, three-dimensional microfluidic devices, complex mechanical systems with embedded cooling channels, or pneumatic actuators for soft robotics, to name a few. In addition, the printing of positive geometries may be time consuming, and the surface of the final print may have an undesirable striated pattern.

Negative or sacrificial structures have been used in traditional casting and molding processes and are commonly made from polymers and other materials that are hard to remove and can be environmentally or biologically (e.g., for tissue scaffolds) harmful.

It would be desirable to have methods effective to create complex geometries with multiple length scales (from micro to macro) using environmentally friendly and biocompatible materials, and when the structure is used as a sacrificial structure, the materials of the sacrificial structure are easy to remove.

SUMMARY OF THE INVENTION

A continuous freeform droplet-on-demand 3D printing process is provided that may be utilized to create smooth surfaces without striated patterns and the need for support structures. The freeform droplet-on-demand 3D printing process may also be used to create negative or sacrificial geometries that may be removed after depositing a positive matrix over the geometries to create solid structures with channel-like features or voids. In addition to the aforementioned advantages, the formation is desirable to reduce processing times and increase the geometric resolution and smoothness of the internal geometries of the solid positive matrix.

Provided herein according to one aspect or embodiment is a method of forming a three-dimensional structure using droplet-based freeform printing. The method includes depositing a structural material through one or more nozzles onto a surface of a substrate by droplet-based freeform printing, such as inkjet printing, to form one or more three-dimensional structures comprising a smooth surface and one or more cross-sectional dimensions. The structural material undergoes a liquid-to-solid transition after deposition of the structural material, and the one or more cross-sectional dimensions are controlled by a droplet ejection frequency.

Also provided herein is a method of fabricating a matrix comprising a three-dimensional structure. The method includes: forming a negative three-dimensional template using droplet-based freeform printing, wherein forming the negative three-dimensional template includes: depositing a structural material through one or more nozzles onto a surface of a substrate by droplet-based freeform printing, such as inkjet printing, to form one or more three-dimensional structures comprising a smooth surface and one or more cross-sectional dimensions, wherein the structural material undergoes a liquid-to-solid transition after deposition of the structural material, and wherein the one or more cross-sectional dimensions are controlled by a droplet ejection frequency; depositing, such as casting, a matrix material over the negative three-dimensional template and at least a portion of the surface of the substrate; and solidifying the matrix material to form a matrix comprising the one or more three-dimensional structures of the negative template.

Various aspects or embodiments of the invention are described in the following numbered clauses:

Clause 1: A method of forming a three-dimensional structure using droplet-based freeform printing comprising: depositing a structural material through one or more nozzles onto a surface of a substrate by droplet-based freeform printing, such as inkjet printing, to form one or more three-dimensional structures comprising a smooth surface and one or more cross-sectional dimensions, wherein the structural material undergoes a liquid-to-solid transition after deposition of the structural material, and wherein the one or more cross-sectional dimensions are controlled by a droplet ejection frequency.

Clause 2: The method of clause 1, wherein the droplet ejection frequency is controlled such that the liquid-to-solid transition of a droplet of the structural material does not undergo a complete liquid-to-solid transition before a subsequent droplet of the structural material is deposited.

Clause 3: The method of clause 1 or 2, wherein the droplet ejection frequency is controlled between 1 Hertz (Hz) to above 1 kHz, such as from 1 Hz to 900 Hz, from 1 Hz to 800 Hz, from 1 Hz to 700 Hz, from 1 Hz to 600 Hz, from 1 Hz to 500 Hz, from 1 Hz to 400 Hz, from 1 Hz to 300 Hz, from 1 Hz to 200 Hz, from 1 Hz to 150 Hz, from 5 Hz to 100 Hz, or from 50 Hz to 100 Hz.

Clause 4: The method of any one of clauses 1 to 3, wherein the one or more three-dimensional structures comprise a branched shape.

Clause 5: The method of any one of clauses 1 to 4, wherein the one or more three-dimensional structures comprise a curvature.

Clause 6: The method of clause 5, wherein the curvature is controlled by moving the substrate and/or by moving the one or more nozzles while the structural material is deposited, wherein the one or more nozzles and the substrate move relative to each other.

Clause 7: The method of any one of clauses 1 to 6, wherein the one or more nozzles comprise a diameter of from 1 micron to 1,000 microns.

Clause 8: The method of any one of clauses 1 to 7, wherein the liquid-to-solid transition is a phase transition, such as freezing, or solidification.

Clause 9: The method of any one of clauses 1 to 8, wherein the structural material comprises water, an aqueous solution, camphene, or combinations thereof.

Clause 10: The method of any one of clauses 1 to 8, wherein the structural material comprises a metal alloy, such as eutectic gallium indium (EGaIn) or Galinstan.

Clause 11: The method of clause 9, wherein the structural material comprises water.

Clause 12: The method of any one of clauses 9 to 11, wherein the structural material further comprises cell response factors, proteins, metabolites, salts, sugars, glycoconjugates, coloring agents, an electrically conductive material, water, an environmental linking agent, or any combination thereof.

Clause 13: The method of clause 12, wherein the electrically conductive material comprises carbon nanotubes, graphene oxide, MXenes, metal nanoparticles, or any combination thereof.

Clause 14: The method of any one of clauses 1 to 13, wherein the one or more three-dimensional structures comprise ice.

Clause 15: The method of any one of clauses 1 to 14, wherein the substrate is above 25° C., at least 25° C., at least 10° C., at least 0° C., at least −10° C., at least −20° C., at least −35° C., or below −35° C. while depositing the structural material.

Clause 16: The method of any one of clauses 1 to 15, wherein the one or more three-dimensional structures comprise a vascular geometry.

Clause 17: The method of any one of clauses 1 to 16, further comprising coating at least a portion of the one or more three-dimensional structures with a coating composition.

Clause 18: The method of clause 17, wherein the coating composition comprises an elastin-collagen hydrogel, alginate, hyaluronic acid, gelatin, agarose, chitosan, cellulose, poly(acrylic acid), poly(vinyl alcohol), poly(ethylene glycol), poly(ethylene oxide), poly(N-isopropylacrylamide), silicone, or a combination of two or more of any of the preceding.

Clause 19: The method of any one of clauses 1 to 18, wherein a subsequent droplet of the structural material is deposited offset from previously deposited droplets of the structural material to form a non-circular cross-sectional shape, such as an oval-shaped cross-section, a super ellipse-shaped cross section, or a circular triangle-shaped cross section.

Clause 20: The method of any one of clauses 1 to 19, wherein the three-dimensional structure is a negative three-dimensional template.

Clause 21: The method of any one of clauses 1 to 20, further comprising spot-heating, e.g. with a laser, a portion of the deposited structural material to modulate the rate of solidification, melt, or ablate at least a portion of the deposited structural material.

Clause 22: A method of fabricating a matrix comprising a three-dimensional structure, comprising: forming a negative three-dimensional template using droplet-based freeform printing, wherein forming the negative three-dimensional template comprises: depositing a structural material through one or more nozzles onto a surface of a substrate by droplet-based freeform printing, such as inkjet printing, to form one or more three-dimensional structures comprising a smooth surface and one or more cross-sectional dimensions, wherein the structural material undergoes a liquid-to-solid transition after deposition of the structural material, and wherein the one or more cross-sectional dimensions are controlled by a droplet ejection frequency; depositing, such as casting, a matrix material over the negative three-dimensional template and at least a portion of the surface of the substrate; and solidifying the matrix material to form a matrix comprising the one or more three-dimensional structures of the negative template.

Clause 23: The method of clause 22, wherein the droplet ejection frequency is controlled such that a droplet of the structural material does not undergo a complete liquid-to-solid transition before a subsequent droplet of the structural material is deposited.

Clause 24: The method of clause 22 or 23, wherein the droplet ejection frequency is from 1 Hertz (Hz) to above 1 kHz, such as from 1 Hz to 900 Hz, from 1 Hz to 800 Hz, from 1 Hz to 700 Hz, from 1 Hz to 600 Hz, from 1 Hz to 500 Hz, from 1 Hz to 400 Hz, from 1 Hz to 300 Hz, from 1 Hz to 200 Hz, from 1 Hz to 150 Hz, from 5 Hz to 100 Hz, or from 50 Hz to 100 Hz.

Clause 25: The method of any one of clauses 22 to 24, wherein the one or more three-dimensional structures comprise a branched shape.

Clause 26: The method of any one of clauses 22 to 25, wherein the one or more three-dimensional structures comprise a curvature.

Clause 27: The method of clause 26, wherein the curvature is controlled by moving the substrate and/or by moving the one or more nozzles while the structural material is deposited, wherein the one or more nozzles and the substrate move relative to each other.

Clause 28: The method of any one of clauses 22 to 27, wherein the one or more nozzles comprise a diameter of from 1 micron to 1,000 microns.

Clause 29: The method of any one of clauses 22 to 28, wherein the liquid-to-solid transition is a phase transition, such as freezing, or solidification.

Clause 30: The method of any one of clauses 22 to 29, wherein the structural material comprises water, an aqueous solution, camphene, or combinations thereof.

Clause 31: The method of any one of clauses 22 to 29, wherein the structural material comprises a metal alloy, such as eutectic gallium indium (EGaIn) or Galinstan.

Clause 32: The method of clause 30, wherein the structural material comprises water.

Clause 33: The method of any one of clauses 30 to 32, wherein the structural material further comprises cell response factors, proteins, metabolites, salts, sugars, glycoconjugates, coloring agents, an electrically conductive material, water, an environmental linking agent, or any combination thereof.

Clause 34: The method of clause 33, wherein the electrically conductive material comprises carbon nanotubes, graphene oxide, MXenes, metal nanoparticles, or any combination thereof.

Clause 35: The method of any one of clauses 22 to 34, wherein the one or more three-dimensional structures comprise ice.

Clause 36: The method of any one of clauses 22 to 35, wherein the substrate is above 25° C., at least 25° C., at least 10° C., at least 0° C., at least −10° C., at least −20° C., or at least −35° C., or below −35° C. while depositing the structural material and/or depositing the matrix material.

Clause 37: The method of any one of clauses 22 to 36, wherein the one or more three-dimensional structures comprise a vascular geometry.

Clause 38: The method of any one of clauses 22 to 37, wherein the matrix material comprises a natural material, a synthetic material, or combination thereof.

Clause 39: The method of clause 38, wherein the natural material comprises natural rubber, collagen, gelatin, elastin, fibrin, alginate, hyaluronic acid, chitosan, silk, agarose, hydrogels thereof, mixtures thereof, or combinations thereof.

Clause 40: The method of clause 38, wherein the synthetic material comprises a synthetic rubber, a resin, a polymeric hydrogel, a ceramic material, or any combinations thereof.

Clause 41: The method of clause 40, wherein the resin is an ultraviolet radiation curable resin.

Clause 42: The method of any one of clauses 22 to 41, further comprising removing the substrate after solidifying the matrix material.

Clause 43: The method of any one of clauses 22 to 42, further comprising subliming, melting, expulsing, or evaporating the one or more three-dimensional structures from the matrix to create a void space within the matrix.

Clause 44: The method of any one of clauses 22 to 43, optionally comprising coating at least a portion of the one or more three-dimensional structures with a coating composition prior to depositing the matrix material.

Clause 45: The method of clause 44, wherein coating composition comprises an elastin-collagen hydrogel, alginate, hyaluronic acid, gelatin, agarose, chitosan, cellulose, poly(acrylic acid), poly(vinyl alcohol), poly(ethylene glycol), poly(ethylene oxide), poly(N-isopropylacrylamide), silicone, or a combination of two or more of the preceding.

Clause 46: The method of any one of clauses 22 to 45, wherein a subsequent droplet of the structural material is deposited offset from previously deposited droplets of the structural material to form a non-circular cross-sectional shape, such as an oval-shaped cross-section, a super ellipse-shaped cross section, or a circular triangle-shaped cross section.

Clause 47: The method of any one of clauses 22 to 46, wherein the matrix is a tissue engineering scaffold.

Clause 48: The method of any one of clauses 22 to 47, further comprising spot-heating, e.g. with a laser, a portion of the deposited structural material to modulate the rate of solidification, melt, or ablate at least a portion of the deposited structural material.

BRIEF DESCRIPTION OF THE DRAWINGS

The terms Fig., Figs., Figure, and Figures are used interchangeably in the specification to refer to the corresponding figures in the drawings FIG. 1 is a schematic (not to scale) of an exemplary three-dimensional printing system.

FIG. 2 includes photographs of print geometries, where a low frequency deposition mode produces layered print geometry (A) and a high frequency deposition mode produces a continuous, smooth geometry (B). The scale bar is 100 microns (μm).

FIGS. 3A-3J depict controlling of the geometry of free-form three-dimensional printing (3D-ICE) printed pillars using droplet ejection frequency. FIG. 3A includes photographs of printing droplets at 5 Hz after 10 seconds (A) and 20 seconds (B), without moving the stage. FIG. 3B includes photographs of printing droplets at 50 Hz after 10 seconds (A) and 20 seconds (B), without moving the stage. FIG. 3C includes photographs of printing droplets at 100 Hz after 10 seconds (A) and 20 seconds (B), without moving the stage. FIG. 3D is a graph of pillar diameter plotted against pillar height for geometries printed at 5 Hz, 50 Hz, and 100 Hz. FIG. 3E is a graph plotting the observed height of a freezing front (measured from the base) as a function of time for 5 Hz, 50 Hz, and 100 Hz deposition frequencies. FIG. 3F is a graph plotting calculated volume of frozen water in the ice pillars in nanoliters (nl) as a function of time for 5 Hz, 50 Hz, and 100 Hz deposition frequencies. The lines without markers indicate total deposited water volume for each deposition frequency as a function of time. For direct comparison with deposited volumes, the ice volumes are reported as water equivalents by multiplying them with the water-to-ice density ratio. From mass conservation, the difference between the dashed and solid lines indicates the volume of the liquid water cap on top of the ice pillars. FIG. 3G is a graph plotting heat flux (in kilowatt per square meter ($kW/m^2$)) as a function of time for 50 Hz and 100 Hz deposition frequencies. FIG. 3H is a graph plotting droplet ejection frequency as a function of droplet number, where pillars with three linearly decreasing frequency profiles were printed. FIG. 3I includes photographs of printed geometries corresponding to the frequency profiles in FIG. 3H of 100 Hz to 80 Hz (A), 100 Hz to 40 Hz (B), and 100 Hz to 5 Hz (C). For each pillar, 2,000 droplets were deposited. FIG. 3J is a graph plotting change in pillar width with increasing height for the pillars shown in FIG. 3I. The scale bars of FIGS. 3A-3C, and 3I are 200 μm.

FIGS. 4A-4J depict printing of support-free overhanging ice forms through control of stage motion coordinated with droplet deposition. FIG. 4A includes photographs of pillars printed by moving the Y stage at constant velocities of (A) 0.1 millimeters per second (mm/s), (B) 0.2 mm/s, (C) 0.3 mm/s, and (D) 0.325 mm/s. At a Y-stage velocity of 0.325 mm/s, the motion was too fast for the freezing rate, and the incoming droplets did not impinge on the existing pillar surface and started to form a new pillar, as shown in (E). FIG. 4B is a schematic depicting the off-axis deposition of the incoming droplet, resulting in a rotation of the freezing front. FIGS. 4C-4E are photographs of pillars printed at constant inclination angles of 40 degrees (FIG. 4C), 60 degrees (FIG. 4D), and 80 degrees (FIG. 4E). FIG. 4F is a graph plotting the overhang angle (measured from the vertical) along the length of the pillars. FIG. 4G is a computer aided design (CAD) model for a simple zigzag structure. FIG. 4H is a graph plotting stage motion trajectories for printing the three-dimensional model illustrated in FIG. 4G. FIG. 4I is a photograph of a pillar having an inaccurate print geometry when printed by moving the stage along a center-line of the desired geometry (dashed line in FIG. 4F). FIG. 4J is a photograph of a pillar printed with corrections applied to the print path based on the curvature of the geometry (solid line of FIG. 4F). The scale bars of FIGS. 4A, 4C-4E, 4I, and 4J are 200 μm.

FIG. 5A is a CAD model (left) of a helical coil three-dimensional geometry with an independent central pillar and a photograph of the as-printed geometry (right). The helix diameter was 400 μm, the strand diameter was 100 μm, and the pillar diameter was 50 μm. FIG. 5B is a CAD model (left) of a branched tree structure with varying branch diameters and a photograph of the as-printed geometry (right). FIG. 5C is a CAD model (left) of an octopus geometry with eight 90 μm diameter tentacles and a photograph of the printed geometry (right). FIG. 5D is graph plotting the width along the main branch of the tree geometry of FIG. 5B. FIG. 5E is a photograph of three repeats of the zigzag geometry from FIG. 4G), demonstrating repeatability of the printing process. The scale bars of FIGS. 5A-5C and 5E are 200 μm.

FIGS. 6A-6F illustrate the reverse molding process. FIG. 6A is a schematic of the reverse molding process. FIG. 6B is a graph plotting the measured resin temperatures during the ultraviolet-curing process as a function of time. FIG. 6C includes photographs of branched tree channels in the cured resin. FIG. 6D includes photographs of the branched tree structure shaped void geometry created in resin, where the channels were perfused with a stain for improved visualization. FIG. 6E includes photographs of an arch shaped void geometry created in resin, where the channels were perfused with a stain for improved visualization. FIG. 6F includes photographs of a helix with an independent central column, where the channels were perfused with a stain for improved visualization. The helix was imaged in two different orientations to show its three-dimensional structure. The scale bars of FIGS. 6C-6F are 200 μm.

FIGS. 7A-7C show three frames from printing of one template at 6.6 seconds, at 10.3 seconds, and at 11.3 seconds, respectively. FIG. 7D is a photographs of 3 branched structures printed at 3 different locations to demonstrate repeatability. The scale bars are 200 μm.

FIG. 8A is a schematic of the printed vascular channel surrounded by a porous collagen matrix, where the dashed line illustrates the imaging plane of FIG. 8B. FIG. 8B is a micrograph that shows the circular cross-section of two parallel channels surrounded by the porous collagen matrix, where the two parallel channels have identical diameters. The micrograph of FIG. 8B was collected using confocal microscopy after the collagen was stained with fluorescein. The scale bar is 200 μm.

DESCRIPTION OF THE INVENTION

Figure 3C:
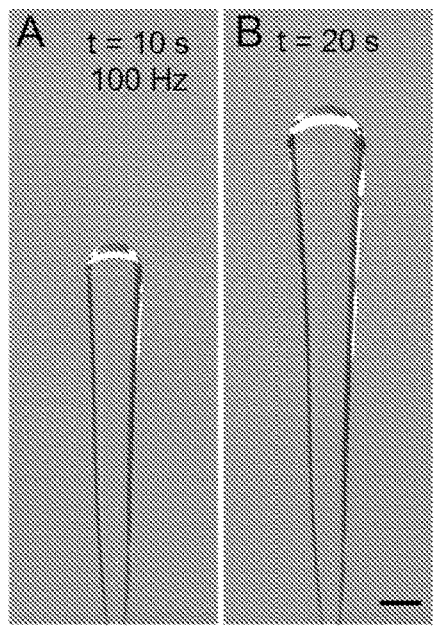

Other than in the operating examples, or where otherwise indicated, the use of numerical values in the various ranges specified in this application are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of ranges is intended as a continuous range including every value between the minimum and maximum values. Further, as used herein, all numbers expressing dimensions, physical characteristics, processing parameters, quantities of ingredients, reaction conditions, and the like, used in the specification and claims are to be understood as being modified in all instances by the term "about". Moreover, unless otherwise specified, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like.

As used herein "a" and "an" refer to one or more. The term "comprising" is open-ended and may be synonymous with "including", "containing", or "characterized by". The term "consisting essentially of" limits the scope of a claim to the specified materials or steps and those that do not materially affect the basic and novel characteristic(s) of the claimed invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting.

Further, as used herein, the terms "deposited over", "formed over", "over", or "provided over" mean formed, deposited, or provided on but not necessarily in contact with a surface. For example, a layer "formed over" a substrate does not preclude the presence of one or more other layers or films of the same or different composition located between the referenced structures. Likewise, the terms "under", or "provided under" mean formed, deposited, or provided beneath, but not necessarily in contact with a surface.

The present invention is directed to a method of forming a three-dimensional structure using three-dimensional free-form printing with a continuous, frequency-modulated droplet-on-demand deposition process. The method comprises depositing a structural material through one or more nozzles onto a surface of a substrate by droplet-based freeform printing, such as inkjet printing, to form one or more three-dimensional structures comprising a smooth surface and one or more cross-sectional dimensions. The structural material undergoes a liquid-to-solid transition after deposition of the structural material, and the one or more cross-sectional dimensions are controlled by a droplet ejection frequency.

According to one aspect or embodiment of the present invention, a method of fabricating a matrix comprising a three-dimensional structure is provided. The method may comprise: forming a negative three-dimensional template; depositing, such as casting, a matrix material over the negative three-dimensional template and at least a portion of the surface of the substrate; and solidifying, e.g., curing, lyophilizing, heating, sintering, or combinations thereof, the matrix material to form a matrix comprising the one or more three-dimensional structures of the negative template. Forming the negative three-dimensional template using droplet-based freeform printing can comprise: depositing a structural material through one or more nozzles onto a surface of a substrate by droplet-based freeform printing, such as inkjet printing, to form one or more three-dimensional structures comprising a smooth surface and one or more cross-sectional dimensions, wherein the structural material undergoes a liquid-to-solid transition after deposition of the structural material, and wherein the one or more cross-sectional dimensions are controlled by a droplet ejection frequency.

According to one aspect or embodiment of the present invention, to prepare a three-dimensional structure and a matrix comprising a three-dimensional structure, a structural material is deposited through one or more nozzles onto a surface of a substrate by a droplet-based freeform printing method to form one or more three-dimensional structures on the surface of the substrate. The one or more three-dimensional structures may have a smooth surface and one or more cross-sectional dimensions. As used herein, "smooth surface" is a continuous surface that has no striations or roughness. In the droplet-based freeform printing method, such as inkjet printing, a structural material is deposited in a suitable pattern, in a suitable shape, and on a suitable substrate. Alternatively, the structural material may be deposited by other additive manufacturing techniques, such as by aerosol jet printing or electrohydrodynamic jet printing.

The continuous and frequency-modulated deposition of the droplets of the structure material from the droplet-based printing freeform printing method enables the depositing of droplets in a desired location before the complete solidification of the one or more three-dimensional structures, allowing for the fabrication of the one or more three-dimensional structures having complex geometries and smooth transitions and surfaces.

As used herein "inkjet printing" involves the printing of an ink in a liquid state, where the ink is ejected through one or more printhead nozzles as droplets and the droplets are deposited onto a suitable substrate. The inkjet printing may be continuous inkjet, thermal, or piezoelectric drop-on-demand printing. In the present invention, a structural material is used as the ink.

As used herein, "liquid state" is intended to mean materials that are capable of being deposited as droplets through the one or more nozzles. The liquid state may include viscous solutions of a structural material that are depositable by inkjet printing. For example, the viscous solutions may include thickened suspensions of a structure material that may further comprise one or more polymers. The viscous solutions may be a gel.

An inkjet printer is a device or system used for inkjet printing. The inkjet printer is capable of producing and accurately depositing droplets of the structural material ranging from less than 1 μm to above 200 μm to produce the three-dimensional structures as described herein. The inkjet printing method is a freeform printing method. As used herein, "freeform printing method" means a printing method that prints a three-dimensional structure that does not require a support during printing.

The inkjet printer may be any suitable inkjet printer. A non-limiting example of a suitable inkjet printer 10 is provided in FIG. 1. The inkjet printer 10 comprises a structural material inlet 14 that delivers the structural material from a suitable reservoir (not shown) to the printhead 12. The printhead 12 includes one or more nozzles 18. The printhead 12 may be a piezoelectric droplet-on-demand printhead 12. The printhead 12 may accommodate one or more nozzles 18 having a diameter ranging from 1 μm to 1,000 μm or increments there between, such as 20 μm to 120 μm, 0.5 μm, 1 μm, 2 μm, 5 μm, 10 μm, 15 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 250 μm, 300 μm, 400 μm, 500 μm, 600 μm, 700 μm, 800 μm, 900 μm, or 1,000 μm.

The printhead 12 comprising the one or more nozzles 18 may be mounted on a stage 16. The stage 16 may be an X-Y-Z axis stage capable of moving along an X-axis, a Y-axis, and/or a Z-axis. The stage 16 may be a Z-axis stage that is capable of moving along a Z-axis. Alternatively to, or in addition to the X-Y-Z axis movement of the stage 16, the stage 16 may be a rotational stage that may move at any angle and/or angular velocity. Alternatively, the printhead 12 comprising the one or more nozzles 18 may be mounted on a Stewart platform. A printhead 12 comprising the one or more nozzles 18 that is mounted on a Z-axis stage 16 may be orthogonal to a substrate 20 on which the three-dimensional printing is completed. Alternatively, the printhead 12 comprising the one or more nozzles 18 may be mounted on a rotational stage or on a Stewart platform and the printhead 12 comprising the one or more nozzles 18 may be at an angle relative to the substrate 20. The printhead 12 comprising the one or more nozzles 18 may be mounted on a rotational stage and the rotational stage may then be mounted to an X-Y-Z axis stage such that the printhead 12 comprising the one or more nozzles 18 can rotate at any angle and/or angular velocity relative to the substrate 20 while also moving along the X axis, the Y axis, and/or the Z-axis.

The substrate 20 on which the one or more three-dimensional structures are printed may be any suitable material. The substrate 20 is positioned directly under the one or more nozzles 18 of the printhead 12 during printing such that the structural material is deposited directly onto the surface of the substrate 20 or the previously printed structure. The substrate 20 may be any suitable material and may comprise flexible or rigid polymers, metals, alumina, ceramics, glass, or combinations thereof. Examples of suitable flexible polymers include, but are not limited to, polydimethylsiloxane (PDMS), polyimide, or poly(lactic acid) substrates. Examples of suitable metals include, but are not limited to stainless steel, copper, or aluminum. The substrate 20 may be a planar substrate 20 or a non-planar substrate 20. The substrate 20 may be selected to withstand temperatures of at least −200° C., at least −150° C., at least −100° C., at least −50° C., at least-40° C., at least −35° C., at least −30° C., at least −20° C., at least −10° C., at least 0° C., at least 5° C., at least 10° C., at least 15° C., at least 20° C., or above 25° C., such as above 25° C., above 30° C., above 40° C., or above 50° C. The substrate 20 may be selected such that the three-dimensional structure or matrix comprising the three-dimensional structures may be easily released from the surface of the substrate 20.

The substrate 20 may be mounted on a stage 28. The stage 28 may be an X-Y-Z axis stage that is capable of moving along an X-axis, a Y-axis, and/or a Z-axis. The substrate 20 may move along an X-axis, a Y-axis, and/or a Z-axis during the printing process. Alternatively to, or in addition to the X-Y-Z axis movement of the stage 28, the stage 28 may be a rotational stage that may move at any angle and/or angular velocity. Alternatively, the substrate 20 may be mounted on a Stewart platform. The substrate 20 may be mounted on a rotational stage or on a Stewart platform and the substrate 20 may be at an angle relative to the one or more nozzles 18. The substrate 20 may be mounted on a rotational stage and the rotational stage may then be mounted on an X-Y-Z axis stage such that the substrate 20 can rotate at any angle relative to the one or more nozzles 18 while also moving along the X axis, the Y axis, and/or the Z-axis.

The one or more nozzles 18 and substrate 20 may be positioned statically during the entire printing process. Alternatively, the substrate 20 and the one or more nozzles 18 may be moved relative to each other or rotated during the printing process.

The substrate 20 may be mounted on a cooling system 22 to control the temperature of the substrate 20. The temperature of the substrate 20 may be decreased by the cooling system 22. The cooling system 22 may comprise a thermoelectric cooler 24, such as a Peltier cooler, and a heat exchanger 26. Alternatively, the cooling system 22 may utilize dry ice or liquid nitrogen to control the temperature of the substrate 20. The cooling system 22 may decrease the temperature, e.g. cool, of the substrate 20 to any suitable temperature, such as from 15° C. to −200° C. or increments there between, such as at least −200° C., at least −150° C., at least −100° C., at least-50° C., at least −40° C., at least −35° C., at least −30° C., at least −20° C., at least −10° C., at least 0° C., at least 5° C., at least 10° C., or at least 15° C. In one non-limiting embodiment, the cooling system 22 may decrease the temperature of the substrate 20 to a temperature of −35° C. The cooling system 22 may be controlled through a computer system (not shown) and may use a recirculating chiller (not shown) to provide a temperature control of ±1° C. The cooling system 22 may be mounted on a stage 28, such as an X-Y-Z axis stage. The substrate 20 may be mounted on the cooling system 22 and the cooling system comprising the substrate 20 may be mounted on a stage 28, such as an X-Y-Z axis stage. The substrate 20 and the cooling system 22 may be mounted on an X-Y-Z axis stage and move along an X-axis, a Y-axis, and/or a Z-axis during the printing process.

The movements of the printhead 12 comprising the one or more nozzles 18 and the substrate 20 may be controlled by a computer system (e.g., controller system, not shown). The controller system may include any required elements for powering the system, such as batteries, e.g., rechargeable batteries and/or a power supply, such as a DC power supply for powering components of the system, signal amplifier(s), microprocessors, non-transient memory such as read-only memory, hard drives, or flash drives, random access memory, analog-to-digital (A/D) converters, and/or communication modules for communicating with other parts of the system, either wirelessly, or wired. The computer system may include a controller, memory, a communications module, an input component, and an output component. It is understood that all or part of the computer system may be a separate, wired structure, or integrated into the inkjet printer. The computer system may comprise a BIOS, one or more signal amplifiers, one or more analog-to-digital converters, memory, storage, processor(s), additional electronic hardware components, and/or computer-readable instructions for controlling the movements of the printhead 12 comprising the one or more nozzles 18 and the substrate 20 and/or for communication within the system or with a separate device, for example, as are known in the computing arts. The computer system may be contained within a single housing or distributed among two or more devices.

The computer system may comprise a controller for executing functions related to receipt, analysis, and transmission of sensed electrical data. For example, the controller may be a central processing engine including a baseline processor, memory, and communications capabilities. The controller can be any suitable processor comprising computer readable memory and configured to execute instructions either stored on the memory or received from other sources. Computer-readable memory can be, for example, a disk drive, a solid-state drive, an optical drive, a tape drive, flash memory (e.g., a non-volatile computer storage chip), cartridge drive, and control elements for loading new software.

The controller may include an executable program, code, set of instructions, or some combination thereof, executable by the controller system for independently or collectively instructing the controller system to interact and operate as programmed, referred to herein as "programming instructions". The programming instructions may be in the form of a G-code. In some examples, the controller is configured to issue instructions to initiate printing of the structural material and/or the movement of the Z-axis and X-Y axis stages.

The inkjet printer 10 may be positioned inside a chamber (not shown) that may control the humidity, pressure, and/or the temperature of the atmosphere surrounding the inkjet printer 10. For example, chamber humidity may be controlled by purging with a dried and/or inert gas, such as, for example, a dry nitrogen or argon purge. The computer system may be outside of the chamber or may be inside the chamber.

The structural material can be deposited from the inkjet printer 10 such that the one or more three-dimensional structures are printed upwards from the surface of the substrate 20. The structural material is a material that undergoes a liquid-to-solid transition upon the deposition of the structural material. The liquid-to-solid transition may be a phase transition. As used herein, a "phase transition" is when a substance changes from one state of matter, i.e., a solid state, liquid state, or gas state to another, different state of matter. The liquid-to-solid transition may be solidification. For example, the structural material may go from the liquid state to the solid state upon deposition of the structural material. Alternatively, the structural material may go from the solid state to the liquid state and back to the solid state, such as through an increase and decrease in temperature or the application and removal a shear stress. The structural material is deposited through the nozzle 18 of the printhead 12 in a liquid state and transitions to the solid state after being deposited on the substrate 20 to form the one or more three-dimensional structures on the surface of the substrate 20.

The structural material may freeze or solidify, i.e., undergo a transition from a liquid state to a solid state. As used herein, "freezing" is the phase transition of substance from a liquid state to a solid state when the temperature of the substance is lowered to at or below its freezing or solidification point. Solidification also may occur by other mechanisms, such as by reducing a shear force applied to a shear-thinning compound, crosslinking or gelation of a polymer, increasing and/or decreasing the temperature, or exposing the structural material to an atmosphere with a specific composition, such as an atmosphere having oxygen (e.g., oxidation). The structural material may be deposited in a liquid state and transition to a solid state when exposed to a temperature below the freezing or solidification point of the structural material. As used herein, "ice" refers to frozen aqueous solutions, including, without limitation: water, salt solutions, sugar solutions, and colloidal suspensions. As used herein, the "solid" may include, without limitation, a crystal structure, an amorphous structure, or a gel.

In one example, the structural material may be a reverse-gelling material, e.g., collagen. The composition of the structural material determines the reverse-gelling capacity, or lower critical solution temperature (LCST) of the structural material. At a temperature less than the gelling temperature, the structural material flows easily and can be deposited in the desired shape. When the temperature is increased above the gelling temperature, e.g. 37° C., the structural material solidifies and retains its shape. The temperature of the structural material may be increased after deposition by locally heating the structural material by spot heating, e.g., with a laser or light source, to form the one or more three-dimensional structures.

The structural material may be a single substance or a mixture of substances, such as, for example and without limitation, a homogenous mixture, a heterogeneous mixture, a colloidal suspension, or a eutectic mixture. The structural material may comprise, consist of, or consist essentially of, without limitation: water; an aqueous solution comprising a dissolved salt and/or a sugar; an aqueous solution comprising a drug product; an aqueous solution comprising a biomolecule such as a nucleic acid, a protein (including post-translationally-modified proteins), or a polysaccharide; an aqueous solution comprising a natural or synthetic polymer; an aqueous colloidal solution; an aqueous solution comprising a dye; camphene; or combinations thereof.

The structural material may comprise a metal alloy. The metal alloy may comprise an alloy of gallium, indium, tin, or combinations thereof. For example, the metal alloy may be eutectic Gallium-Indium (EGaIn) or eutectic Gallium-Indium-Tin (Galinstan).

Alternatively, the structure material may comprise collagen. The structure material may be reverse-gelling in that heating the structure material, e.g., above a lower critical solution temperature (LCST) causes solidification. As such, the substrate may be heated, and the deposited material may change from a liquid to a solid (e.g., a hydrogel) by heating instead of cooling.

When the structural material comprises water, that is, is an aqueous solution, it may be deposited in the liquid state and undergoes a phase transition to the solid state when exposed to temperatures below its freezing point, e.g. 0° C., to form one or more three-dimensional structures comprising ice. The surface of the substrate 20 on which the one or more three-dimensional structures are formed may be cooled to temperatures ranging from −200° C. to 0° C. or increments there between, such as from −150° C. to 0° C., from −100° C. to 0° C., from −50° C. to 0° C., from −40° C. to 0° C., or from −35° C. to 0° C. to freeze the water after deposition. In one non-limiting embodiment, the surface of the substrate 20 is −35° C. If the inkjet printer 20 is housed in a chamber, the atmosphere of the chamber may also be cooled to temperatures ranging from −200° C. to 0° C. or increments there between, such as from −150° C. to 0° C., from −100° C. to 0° C., from −50° C. to 0° C., from −40° C. to 0° C., or from −35° C. to 0° C. That said, care needs to be taken not to freeze liquid in the deposition nozzle, especially where the chamber is cooled. The chamber may comprise an inert atmosphere, e.g., argon or nitrogen gas. Relative humidity may be controlled in the chamber, but should not be so low so as to cause sublimation or evaporation of water from the structural material.

When the structural material comprises camphene, the camphene is deposited in the liquid state and undergoes a phase transition to the solid state when exposed to ambient temperatures (e.g., room temperature, ranging from 20° C. to 25° C.) to form one or more three-dimensional structures comprising frozen (solid) camphene. To form the initial liquid state of camphene, the camphene may be heated to at least its melting point, such as temperatures ranging from 55° C. to 65° C. As used herein, "melting" is the transition of substance from the solid state to the solid state when the temperature of the substance is increased to at or above its melting point. The surface of the substrate 20 on which the one or more three-dimensional structures are formed may be maintained at temperatures ranging from 0° C. to 25° C. to solidify the camphene after deposition. If the inkjet printer 20 is housed in a chamber, the atmosphere of the chamber may also be cooled to temperatures ranging from 0° C. to 25° C. or increments there between.

When the structural material comprises a metal alloy, such as EGaIn or Galinstan, a sufficient shear stress is applied to the metal alloy to transition the metal alloy from an elastic solid state to a fluid state, e.g., a liquid state, and upon removal of the shear stress, the metal alloy transitions back to an elastic solid to form one or more three-dimensional structures. The non-Newtonian behavior of fluids whose viscosity decreases under shear strain is referred to as "shear thinning". As used herein, "elastic solid" is a deformable state that possesses the property of recovering an original configuration when forces causing the deformation are removed. For example, a sufficient shear stress may be applied when the metal alloy is ejected through the nozzle of the droplet-based printer, such as an inkjet printer. The structural material may optionally comprise one or more additional additives to form a mixture. The additional additives may include but are not limited to cell response factors, proteins, soluble salts, soluble sugars, glycoconjugates, coloring agents, an electrically conductive material, water, an environmental linking agent, or any combination thereof.

The cell response factors may include, but are not limited to, cell growth factors, extracellular vesicles, metabolites, or combinations thereof to promote angiogenesis or cell proliferation and differentiation. Suitable cell growth factors include, but are not limited to, basic fibroblast growth factor (bFGF), acidic fibroblast growth factor (aFGF), vascular endothelial growth factor (VEGF), hepatocyte growth factor (HGF), insulin-like growth factors 1 and 2 (IGF-1 and IGF-2), platelet derived growth factor (PDGF), stromal derived factor 1 alpha (SDF-1 alpha), nerve growth factor (NGF), ciliary neurotrophic factor (CNTF), neurotrophin-3, neurotrophin-4, neurotrophin-5, pleiotrophin protein (neurite growth-promoting factor 1), midkine protein (neurite growth-promoting factor 2), brain-derived neurotrophic factor (BDNF), tumor angiogenesis factor (TAF), corticotrophin releasing factor (CRF), transforming growth factors α and β (TGF-α and TGF-β), interleukin-8 (IL-8), granulocyte-macrophage colony stimulating factor (GM-CSF), interleukins, and interferons. The cell response factors may be present in the structural material to leave a residue of the cell response factors in the matrix upon evaporation or sublimation of the structural material.

Soluble salts and/or soluble sugars may be present in the structural material to adjust the phase transitions of the structural material and/or to leave a residue of the salt and/or soluble sugar in the matrix upon evaporation or sublimation of the structural material.

The electrically conductive material may include, but is not limited to, conductive carbon allotropes such as carbon nanotubes, graphene oxide, MXenes, metal nanoparticles, or any combination thereof. The electrically conductive materials may form an electrically conductive negative three-dimensional template and/or an electrically conductive matrix comprising a three-dimensional structure upon evaporation or sublimation of the structural material.

The three-dimensional structures comprise one or more three-dimensional structures. The three-dimensional structure may comprise one three-dimensional structure. The three-dimensional structure may comprise multiple three-dimensional structures that are suitably spaced across the surface of the substrate, limited only by the size of the substrate and the size and shape of the three-dimensional structures. For example, the three-dimensional structure may comprise two three-dimensional structures, three three-dimensional structures, four three-dimensional structures, up to ten three-dimensional structures, up to twenty three-dimensional structures, up to fifty three-dimensional structures, up to one hundred three-dimensional structures, or more than one hundred three-dimensional structures. The three-dimensional structure may be an array, wherein "array" refers to a substrate comprising multiple, three-dimensional structures, often in the shape of a square or rectangle, and the three-dimensional structures may be regularly-spaced, and/or individually-addressable.

Figure 5A:
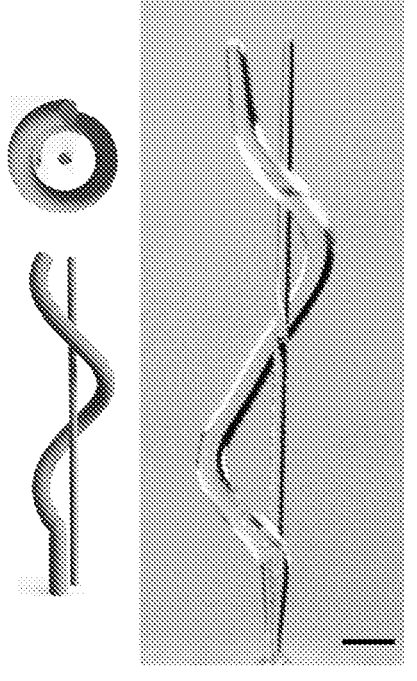
FIG. 5A-5E depict 3D-ICE printing of complex 3D geometries with micro-scale features and smooth walls.
Figure 5B:
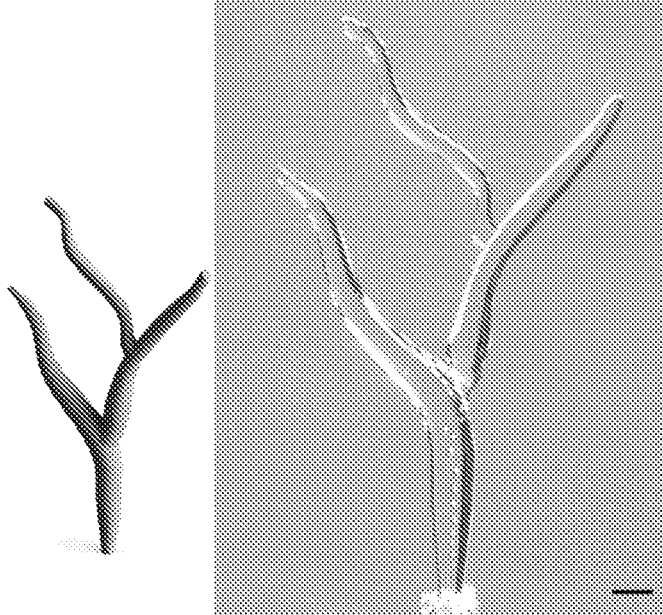

The one or more three-dimensional structures of the three-dimensional structure deposited from the structural material may have any shape and may be any size. For example, the one or more three-dimensional structures may comprise straight portions, curved portions, or combinations thereof. The one or more three-dimensional structures may comprise pillar shapes, spherical shapes, branched shapes, helical shapes, or combinations thereof. For example, the one or more three-dimensional structures may be a branched shape comprising smooth interconnects between the branches. The one or more three-dimensional structures may mimic a vascular or arterial geometry (FIG. 5B). The one or more three-dimensional structures may mimic a series of electrical circuits. The one or more three-dimensional structures alone, or in combination, may mimic a capacitor or an antenna. The one or more three-dimensional structures, alone or in combination, may define a series of microfluidic channels. The one or more three-dimensional structures may have a height ranging from 10 μm to 10,000 μm, including any increment there between, such as 50 μm, 75 μm, 100 μm, 125 μm, 150 μm, 175 μm, 200 μm, 225 μm, 250 μm, 275 μm, 300 μm, 350 μm, 400 μm, 500 μm, 600 μm, 700 μm, 800 μm, 900 μm, 1,000 μm, 1,500 μm, 2,000 μm, 2,500 μm, 3,000 μm, 3,500 μm, 4,000 μm, 4,500 μm, 5,000 μm, 5,500 μm, 6,000 μm, 6,500 μm, 7,000 μm, 7,500 μm, 8,000 μm, 8,500 μm, 9,000 μm, 9,500 μm, or 10,000 μm.

The one or more three-dimensional structures comprise one or more cross-sectional dimensions. The one or more cross-sectional dimensions may be a radius, a diameter, a major axis, a minor axis, a hypotenuse, or combinations thereof. The one or more three-dimensional structures may comprise a circular cross-sectional shape, a non-circular cross-sectional shape (e.g., an oval-shaped cross-section, a super ellipse-shaped cross-section, a circular triangle-shaped cross-section), or combinations thereof. The cross-sectional shape of the one or more three-dimensional structures may be controlled by moving the substrate 20 and/or by moving the one or more nozzles 18 while the structural material is being deposited, wherein the one or more nozzles 18 and the substrate 20 move relative to one another to form the cross-sectional shape, in combination with controlling the droplet ejection frequency. For example, subsequent droplets of the structure material may be deposited offset from previous droplets of the structure material to form non-circular cross-sectional shapes, such as an oval-shaped cross-section, a super ellipse-shaped cross-section, or a circular-triangle shaped cross-section. A single three-dimensional structure may comprise a single cross-sectional dimension or multiple cross-sectional dimensions with smooth transitions between the different cross-sectional dimensions. For example, a single three-dimensional structure may comprise two different cross-sectional dimensions, three different cross-sectional dimensions, five different cross-sectional dimensions, up to ten different cross-sectional dimensions, up to twenty different cross-sectional dimensions, up to fifty different cross-sectional dimensions, or more than fifty different cross-sectional dimensions. The three-dimensional structures may have cross-sectional dimensions ranging from 20 μm to 400 μm, including any increment there between, such as from 50 μm to 400 μm, 75 μm, 80 μm, 100 μm, 120 μm, 140 μm, 150 μm, 170 μm, 200 μm, 300 μm, or 400 μm.

The ejection frequency of a droplet of structure material, or the droplet ejection frequency by a droplet-based free-form printer, e.g. an inkjet printer, may control the one or more cross-sectional dimensions of the one or more three-dimensional structures by controlling the size of a liquid pool at the printing location. The liquid-to-solid transition of the structural material may arise from cooling the structural material to at or below its freezing point or solidification point after deposition. Without being bound by theory, upon deposition of a droplet of structural material from the one or more nozzles 18, the droplet of the structural material forms a liquid pool at the print surface (FIG. 4B). When the droplet ejection frequency is below a critical value, the individual droplet of the structural material undergoes a complete liquid-to-solid transition from the liquid state to the solid state before a subsequent droplet of structural material is deposited onto the print surface. This low droplet ejection frequency forms a three-dimensional structure having a striated surface and a cross-sectional dimension that is approximately equal to diameter of the one or more nozzles 18. When the droplet ejection frequency is selected such that a deposited droplet of structural material does not undergo a complete liquid-to-solid transition from the liquid state to the solid state before a subsequent droplet of structural material is deposited onto the print surface, the resulting surface of the three three-dimensional structure may be smooth. In that case, the liquid pool at the print surface is present as multiple droplets of structural material and undergoes a transition from the liquid state to the solid state, e.g. freezes or solidifies, in the direction of the additive growth of the three-dimensional structure. The three-dimensional structures printed at higher droplet ejection frequencies may comprise one or more cross-sectional dimensions that are larger than diameter of the nozzle 18, as the cross-sectional dimension of the liquid pool is proportional to the cross-sectional dimension of the three-dimensional structure. For example, the structural material may be deposited from a 50 μm nozzle and may form a three-dimensional structure comprising one or more cross-sectional dimensions ranging from 50 μm to 400 μm, or any increment there between, based on the droplet ejection frequency. Where the droplets freeze or solidify, the temperature at the location of the droplet deposition will affect freezing speed, and therefore droplet ejection frequency may be adjusted to produce a desired thickness, shape, and smoothness of the three-dimensional structure.

The droplet ejection frequency may range from 1 Hertz (Hz) to above 1 kHz or any increment there between, such as from 1 Hz to 900 Hz, from 1 Hz to 800 Hz, from 1 Hz to 700 Hz, from 1 Hz to 600 Hz, from 1 Hz to 500 Hz, from 1 Hz to 400 Hz, from 1 Hz to 300 Hz, from 1 Hz to 200 Hz, from 1 Hz to 150 Hz, from 5 Hz to 100 Hz, from 50 Hz to 100 Hz, from 40 Hz to 100 Hz, from 80 Hz to 100 Hz, 25 Hz, 50 Hz, or 100 Hz.

To control the one or more cross-sectional dimensions of the one or more three-dimensional structures, the droplet ejection frequency of the structural material may be increased or decreased during the printing process to accommodate the upward growth of the one or more three-dimensional structures. For example, the droplet ejection frequency may be linearly reduced during the printing process. The droplet ejection frequency may be decreased from 100 Hz to 5 Hz, from 100 Hz to 40 Hz, or from 100 Hz to 80 Hz during the printing process. Without being bound by theory, when the distance between the surface of the substrate 20 and the print surface increases, the heat flux at the liquid pool at the print surface reduces and thus, the rate of the liquid-to-solid transition, e.g. freezing or solidifying, from the liquid state to the solid state decreases.

When the structural material comprises water and the surface of the substrate 20 is decreased to a temperature below the freezing point of water, e.g. less than 0° C., such as −35° C., as the distance between the cooled surface of the substrate 20 and the print surface increases, the rate of freezing, e.g., ice formation, decreases due to the heat flux reduction at the liquid pool.

As the rate of the transition from the liquid state to the solid state decreases, the cross-sectional dimension of the liquid pool at the print surface increases. Thus, to achieve a three-dimensional structure having a desired cross-sectional dimension, the droplet ejection frequency may be decreased to reduce the cross-sectional dimension of the liquid pool present at the print surface in order to control the transition from the liquid state to the solid state. The rate that the liquid pool transitions from the liquid state to the solid state may, optionally, be controlled by spot heating, e.g., with a laser or light source. A depiction of an optional laser or light source 30 acting upon the liquid pool is shown in FIG. 4B. The laser or light source acting upon the liquid pool may locally control the cross-sectional dimension of liquid pool. The power, direction, and/or frequency of the laser or light source may be controlled by the system in combination with the droplet ejection frequency to control the resulting shapes and smoothness of the one or more three-dimensional structures. The rate that the liquid pool transitions from the liquid state to the solid state may, optionally, be controlled by using an environmental linking agent in the structural material. The amount of the environmental linking agent in the structural material may be controlled in combination with the droplet ejection frequency to control the resulting shapes and smoothness of the one or more three-dimensional structures. Spot heating, e.g. with a laser or light source, may be used in combination with the environmental linking agent and the droplet ejection frequency to control the resulting shapes and smoothness of the one or more three-dimensional structures. For example, spot heating can be used to ablate regions or portions of the as-formed one or more three-dimensional structures.

The one or more three-dimensional structures may comprise a curvature. The curvature of the one or more three-dimensional structures may be controlled by moving the substrate 20 and/or by moving the one or more nozzles 18 while the structural material is being deposited, wherein the one or more nozzles 18 and the substrate 20 move relative to one another to form the curvature. For example, when the substrate 20 moves along an X-axis, a Y-axis, and/or a Z-axis and/or rotates at an angle relative to the one or more nozzles 18 during the printing process, the one or more nozzles 18 may remain stationary, e.g., do not move along an X-axis, a Y-axis, and/or a Z-axis and/or rotate. Alternatively, when the one or more nozzles 18 move along X-axis, a Y-axis, and/or a Z-axis and/or rotates at an angle relative to the substrate 20 during the printing process, the substrate 20 remains stationary, e.g., does not move along an X-axis, a Y-axis, and/or a Z-axis and/or rotate. The substrate 20 may be moved along an X-axis, a Y-axis, and/or a Z-axis at a constant velocity. For example, the substrate 20 may be moved at a constant velocity ranging from 0.1 to 0.4 millimeters per second (mm/s). Alternatively, the velocity of the substrate 20 along an X-axis, a Y-axis, and/or a Z-axis may be varied. The one or more nozzles 18 may be moved along an X-axis, a Y-axis, and/or a Z-axis at a constant velocity. Alternatively, the velocity of the one or more nozzles 18 along an X-axis, a Y-axis, and/or a Z-axis may be varied.

The curvature may include curved portions and/or overhanging angles. For example, the one or more three-dimensional structures may comprise overhanging angles of at least 40 degrees, at least 60 degrees, at least 75 degrees, at least 80 degrees, or at least 90 degrees, as measured from a vertical portion of the three-dimensional structure. When the overhanging angles are larger than a specific amount or have an angle of less than 5 degrees or 10 degrees with the horizontal, optional, temporary support structures may be used until the one or more three-dimensional structures are completely solidified. After complete solidification of the one or more three-dimensional structures, the optional, temporary supports may be removed, such as by spot heating, e.g., with a laser or light source, or burning the temporary supports. The removal of the temporary supports is done in a manner that does not negatively impact the smoothness and/or the geometry of the one or more three-dimensional structures.

The one or more three-dimensional structures may be optionally coated with a coating composition. The coating composition may comprise a natural material, a synthetic material, or combinations thereof. As used herein, a "natural material" is a material that is obtained from a biological source. As used herein, a "synthetic material" is material that is synthesized, or man-made. The natural material and/or synthetic material may comprise polymers. As used herein "polymer" as a class includes, without limitation, homopolymers, heteropolymers, co-polymers, block polymers, block co-polymers. Homopolymers contain one type of building block, or monomer, whereas co-polymers contain more than one type of monomer. An "oligomer" is a polymer that comprises a small number of monomers, such as, for example, from 3 to 100 monomer residues. As such, the term "polymer" includes oligomers.

The natural material of the coating composition may include, but is not limited to, alginate, fibrin, hyaluronic acid, gelatin, agarose, chitosan, elastin, collagen, mixtures thereof, hydrogels thereof, or combinations thereof. In one non-limiting embodiment, the coating composition may comprise an elastic hydrogel, such as an elastin-collagen hydrogel. As used herein, a "hydrogel" is a water insoluble, three-dimensional network of polymer chains. The synthetic material of the coating composition may include, but is not limited to, poly(acrylic acid), poly(vinyl alcohol), poly (ethylene glycol), poly(ethylene oxide), poly(n-isopropylacrylamide), silicone, mixtures thereof, hydrogels thereof, or combinations thereof. The coating composition may further include cell response factors, proteins, soluble salts, soluble sugars, glycoconjugates, coloring agents, an electrically conductive material, or any combination thereof. The coating composition may be applied to the one or more three-dimensional structures through any suitable method, such as dip coating or spray coating.

The three-dimensional structure may be a negative three-dimensional template. The negative three-dimensional template may be used to fabricate a matrix, e.g., a positive part, comprising the three-dimensional structures of the negative template. After formation of the negative three-dimensional template, a matrix material may be deposited, such as casted, over the negative three-dimensional template and at least a portion of the surface of the substrate 20. After depositing the matrix material over the negative three-dimensional template and at least a portion of the surface of the substrate 20, the matrix material is solidified to form the matrix, wherein the matrix comprises the three-dimensional structures of the negative template.

The matrix material may be deposited using any suitable method, such as casting. For example, the negative three-dimensional template may be submerged in a solution of the matrix material. The solution of the matrix material may comprise the matrix material and a suitable liquid medium. For example, the liquid medium may comprise water, ethanol, acids, bases, organic solvents, or combinations thereof. In one non-limiting embodiment, the liquid medium comprises a 25:75 volume/volume (v/v) mixture of ethanol and water. The solution of the matrix material may comprise additional additives, such as chemical cross-linkers. In one non-limiting embodiment, the solution of the matrix material comprises one or more silane cross-linkers.

The matrix material may comprise a natural material, a synthetic material, or a combination thereof. The matrix material may comprise a natural material, such as a natural material that may form a gel or hydrogel. Non-limiting examples of suitable natural materials include, but not are limited to, natural rubber, collagen, gelatin, elastin, fibrin, alginate, hyaluronic acid, chitosan, agarose, silk, mixtures thereof, hydrogels thereof, or combinations thereof. In one non-limiting embodiment, the matrix material comprises collagen, such as type I collagen.

The matrix material may comprise a synthetic material, including, but not limited to, synthetic rubbers, polymeric resins, polymeric hydrogels, ceramic materials, or any combination thereof. The polymeric resins may be solvent processable or water processable polymeric resins, such as acrylic resins, polyethylene glycol resins, methylacrylic resins, acrylamide resins, or polysiloxane resins. For example, the polymeric resin may be poly(acrylic acid), poly(vinyl alcohol), poly(ethylene glycol), poly(ethylene oxide), poly(N-isopropylacrylamide), silicone, mixtures thereof, hydrogels thereof, or combinations thereof. The ceramic materials may comprise hydroxyapatite and/or another calcium phosphate. In one non-limiting embodiment, the matrix material may comprise an acrylic resin, such as an ultraviolet radiation curable acrylic resin. In another non-limiting embodiment, the matrix material may comprise a polysiloxane resin, such as PDMS.

The temperature of the solution of the matrix material may be reduced prior to depositing the matrix material over the one or more three-dimensional structures of the negative template and at least a portion of the surface of the substrate 20. Reducing the temperature of the solution of a matrix material may prevent the one or more three-dimensional structures of the negative template from phase transitioning, e.g., melting, from the solid state to the liquid state. For example, the solution of a matrix material may be reduced to a temperature of less than 0° C., such as −10° C. In one non-limiting embodiment, the negative template comprises one or more three-dimensional structures comprising ice, and the solution of the matrix material is reduced to less than 0° C., such as −10° C., to prevent the phase transition, e.g., melting, of the ice to an aqueous solution during the depositing process.

The matrix material is solidified to form a matrix. The matrix material may be solidified by any suitable method. As used herein, "solidified" means that a solid matrix is formed from the solution of the matrix material. For example, the matrix material may be solidified by lyophilization, heating, curing, sintering, or combinations thereof.

In one non-limiting embodiment, the matrix material comprises collagen that is solidified and then lyophilized to form a porous, collagen matrix. In another non-limiting embodiment, the matrix material comprises a ceramic material that is solidified by sintering. In another non-limiting embodiment, the matrix material comprises an ultraviolet radiation curable acrylic resin that is solidified by curing the matrix material using ultraviolet radiation. The source of ultraviolet radiation may be a lamp or a light emitting diode (LED), such as a LED emitting ultraviolet wavelengths, such as wavelengths ranging from 400-410 nanometers.

The matrix material is solidified in a manner that prevents the one or more three-dimensional structures from undergoing a phase transition from the solid state to the liquid state, e.g., melting. For example, when the matrix material comprises an ultraviolet radiation curable resin and the one or more three-dimensional structures comprise ice, the intensity of the ultraviolet radiation from the source may be increased slowly to prevent melting of the ice.

The substrate 20 may be removed after the matrix material is solidified into the matrix. Alternatively, the substrate 20 may be removed before the matrix material is solidified into the matrix.

The negative three-dimensional template may be a sacrificial template. Following the solidification of the matrix material, the one or more three dimensional structures may be removed from the matrix by any suitable method. For example, the one or more three-dimensional structures may be removed from the matrix by subliming, melting, expulsing, evaporating, or any combination thereof. As used herein, "subliming" is the phase transition of a substance from the solid state to the gas state. In one non-limiting embodiment, the one or more three-dimensional structures comprise ice, and the one or more three-dimensional structures are removed by sublimation, e.g. lyophilization. In another non-limiting embodiment, the one or more three-dimensional structures comprise ice, and the one or more three-dimensional structures are melted by increasing the temperature of the matrix above the freezing point of the aqueous solution. The aqueous solution may then be removed from the matrix by vacuum.

Removing the one or more three-dimensional structures from the matrix forms a positive part, where the matrix comprises a void space having the three-dimensional shape of the one or more three-dimensional structures. The walls of the void space having the three-dimensional shape of the one or more three-dimensional structures may comprise the additional additives that were added to the structural material during deposition. The walls of the void space having the three-dimensional shape of the one or more three-dimensional structures may comprise the coating composition applied to the surface of the one or more three-dimensional structures.

Alternatively, the negative three-dimensional template may remain within the matrix, where the matrix forms around the one or more three-dimensional structures.

The matrix may be a tissue engineering scaffold. For example, the one or more three-dimensional structures of the negative template may comprise a vascular geometry and may comprise ice. The matrix material deposited over the negative three-dimensional template may comprise a natural material, such as collagen. The natural material may be solidified and lyophilized, wherein the lyophilization of the natural material to form the matrix also lyophilizes the one or more three-dimensional structures leaving void spaces in the natural material matrix having the three-dimensional vascular geometry shape of the one or more three-dimensional structures.

The matrix may be a microfluidic device. For example, the one or more three-dimensional structures of the negative template may mimic a series of microfluidic channels and may comprise ice. The matrix material deposited over the negative three-dimensional template may comprise a synthetic material, such as PDMS. The synthetic material may be solidified by curing. The one or more three-dimensional structures may be removed from the matrix by sublimation, leaving void spaces as series of microfluidic channels in the synthetic material matrix.

The matrix may be an electronic device. For example, the one or more three-dimensional structures of the negative template may mimic an antenna or a circuit and may comprise a metal alloy, e.g. EGaIn or Galinstan. The matrix material deposited over the negative three-dimensional template may comprise a synthetic material, such as PDMS. The synthetic material may be solidified by curing. The one or more three-dimensional structures may remain in the matrix material.

The following examples are presented to demonstrate the general principles of the invention. The invention should not be considered as limited to the specific examples presented.

EXAMPLES

Example 1—Design and Construction of the Three-Dimensional Ice Printing System A freeze three-dimensional inkjet printing system 10 was developed. In this approach, a rapid liquid-to-solid phase change was induced to printable ink through freezing. A schematic of the printing system can be found in FIG. 1.

The inkjet three-dimensional printing system used water as the ink and kept the print volume at temperatures below the freezing point of water by cooling the build platform. An inkjet printhead (MJ-AB-01, MicroFab Tech., Plato, TX) that accommodated nozzle diameters from 20 to 120 microns (μm) was mounted on the Z-axis stage. Water was delivered to the inkjet printhead through a water inlet. The size of the ejected droplets was found to be a function of the nozzle diameter and the voltage waveform applied to the piezoelectric printhead.

A temperature-controlled build platform was constructed and mounted on an X-Y axis stage. Printing was done on a 12 millimeter (mm) by 15 mm copper print plate. The print plate was attached to the cooled build platform using a vacuum chuck to prevent unintended relative lateral motion between the motion stage and build surface. The platform was cooled using a two-stage system of a Peltier cooler (25412-5L31-07CQQ Custom Thermoelectric, LLC, Bishopville, MD, USA) sandwiched between a heat exchanger (WBA-1.62-0.55-CU-01 Custom Thermoelectric, LLC) and the copper vacuum chuck. Indium foil (Custom Thermoelectric, LLC) was used to ensure good thermal contact between the layers. A recirculating chiller (Vevor USA) was used to cool HC-50 coolant (Dynalene, Inc., Whitehall, PA, USA) to −20 degrees Celsius (° C.), which was circulated through the heat exchanger for the first stage of cooling. The Peltier cooler provided the next stage of cooling. A thermal controller (ETC-AED330A-24 Custom Thermoelectric, LLC) was used to switch the Peltier cooler on and off in response to platform temperature measured using a thermistor (Mouser Electronics, Mansfield, TX, USA), allowing the temperature of the build platform to be controlled to within +/−1° C.

The cooling assembly was mounted onto an X-Y stage (ALS130-150, Aerotech Inc., Pittsburgh, PA, USA) through a thermally insulating Teflon™ block. The XYZ stages and printhead having the nozzle were controlled using a single A3200 Npaq motion controller (Aerotech Inc., Pittsburgh, PA, USA). To eject a single droplet, the motion controller sent a high-speed digital pulse to the JetDrive controller (Microfab Technologies, Inc., Plano, TX, USA), which applied the analog jetting waveform to the piezoelectric nozzle to eject a droplet.

A constant platform temperature of −35° C. was used. To prevent frost formation on the build platform and printed constructs, the system was placed in an acrylic enclosure and the humidity inside the print chamber was controlled using a dry nitrogen purge. Before starting the printing, the chamber was purged with dry nitrogen for at least 15 minutes to eliminate ambient humidity. The nitrogen inlet was designed to prevent the formation of recirculation zones and allow uniform dispersion of dry nitrogen gas throughout the chamber. The nitrogen was turned off during the actual printing process to minimize air currents around the build surface.

Example 2—Three-Dimensional Printing of Ice

The rapid phase change and the strength of the frozen ink enabled freeform three-dimensional printing (3D-ICE) of ice structures without requiring support structures. 3D-ICE was used fabricate structures with smooth surfaces, continuous (non-discrete) variations in diameter, and overhanging features, which were enabled by the freeform three-dimensional fabrication method with droplet-ejection frequency modulation synchronized with stage motions.

Materials and Methods

Printing Process: The three-dimensional ice printing system described in Example 1 was utilized. The printhead nozzle was a 50 um nozzle. Inkjetting was performed using a sinusoidal waveform with a period of 10 microseconds (μs) and amplitude of 17.0 Volts (V), resulting in 50 μm diameter droplets. During printing, a standoff distance of 5 mm was specified from the nozzle to the stage. The nozzle was not moved in the Z-direction during printing. Deionized purified water was used as the ink to ensure consistent freezing behavior. The water used for printing was in a glass vial and fed to the inkjet nozzle via PTFE (Polytetrafluoroethylene) tubing. A manually-controlled pneumatic system was used to adjust back pressure at the printhead to achieve stable ejection of water droplets. Additionally, the pneumatic system was also used to apply positive pressure to the water to purge it from the nozzle for cleaning the nozzle prior to printing.

Print shapes were designed in SolidWorks (Dassault Systemes SolidWorks Corporation, Waltham, MA, USA) computer aided design (CAD) software and then transferred into MATLAB (MathWorks, Portola Valley, CA, USA). Spline functions were fit to individual print segments. Print stage motions were then generated from segment centerlines, and a correction factor was calculated based on the local segment curvatures. Droplet ejection frequencies were calculated based on desired local segment width and height above the build surface (to account for the vertical thermal gradient in our setup). Final print paths were compiled in the AeroBasic language (Aerotech Inc., Pittsburgh, PA, USA) and were uploaded to the controller to print the desired shapes. Running the code in real-time on the motion controller allowed coordination between the stage motion and high-speed droplet ejection.

The printing process was observed using a color camera (MU1203-BI, Amscope) coupled to a long working distance objective (Infinity Photo-Optical Company, Centennial, CO, USA), resulting in a 3.7 mm by 4.9 mm field of view. A bright white laser-emitted diode (LED) bulb was used to illuminate the scene, and a gray back-drop was used for imaging. An LED strobe synchronized to droplet ejection was used to view the jetted droplets and ensure consistent jetting of water droplets before the start of the printing. Acquired images were processed using Fiji.

Statistical Analysis: The sample size (n) for statistical analysis was chosen as n=5. In one case, 25 repeated experiments were conducted to better understand the nature of statistical distribution of data. MATLAB (MathWorks, Portola Valley, CA, USA) was used to calculate the mean and standard deviation (SD). Error bars are reported as measured range.

Results and Discussion

Pillar diameter control using frequency modulation: The nozzle chosen was a 50 μm nozzle. The fabrication of straight ice pillars with circular cross-sections were printed without using X-Y stage motions. The diameter of the pillars were controlled by modulating the droplet ejection frequency. During freeze printing, a liquid pool forms at the print surface (e.g., top of the pillar), where the cross-sectional diameter of the liquid pool is inversely proportional to the freezing rate (heat flux) at the freeze front. When the cooling is unidirectional, i.e., originated from the bottom platform only, the freezing rate depends on the length of the pillar since the heat transfer is controlled primarily by conduction. A thicker liquid pool requires a longer duration to freeze.

When the droplet ejection occurred below a critical frequency, the individual droplet froze before the next one arrived, which resulted in a striated print geometry (FIG. 2(A)), where a layered shape was visible. In contrast, the liquid pool consisted of multiple droplets at higher frequencies. The liquid pool continuously froze in the direction of pillar growth, which resulted in smooth geometries (FIG. 2(B)). The diameter of the liquid pool also increased with deposition frequency, producing printed ice structures with larger diameters (FIGS. 3A-3D). This relationship enabled the varying of the diameter of the printed ice structures in-situ by modulating the droplet ejection frequency.

Figure 3D:
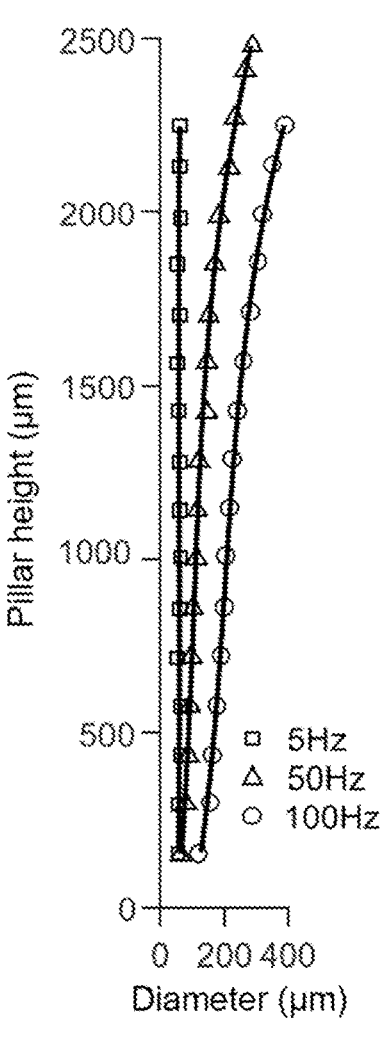
Figure 3E:
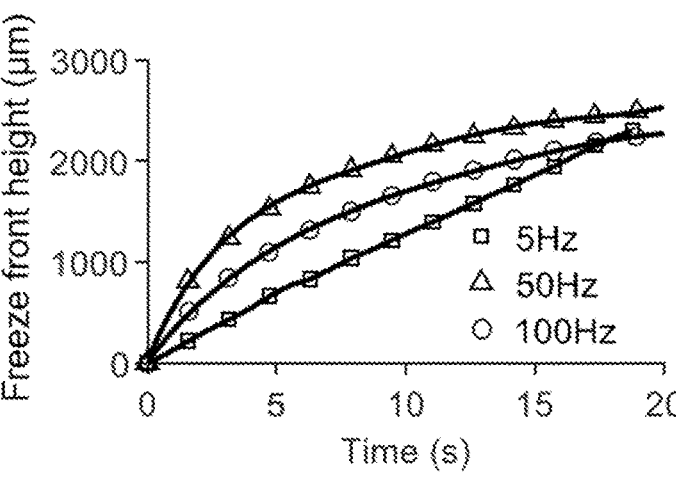
Figure 3F:
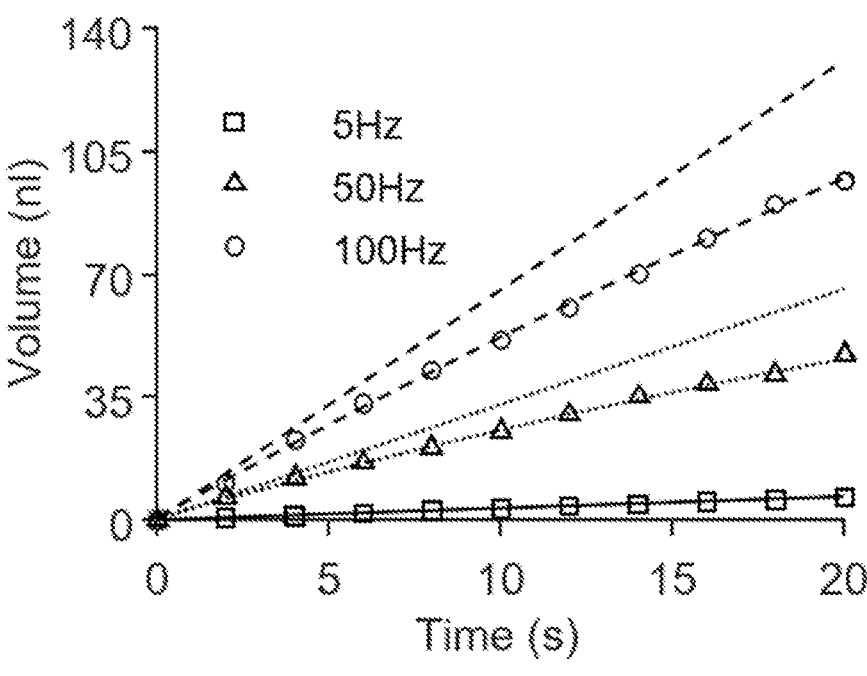
Figure 3G:
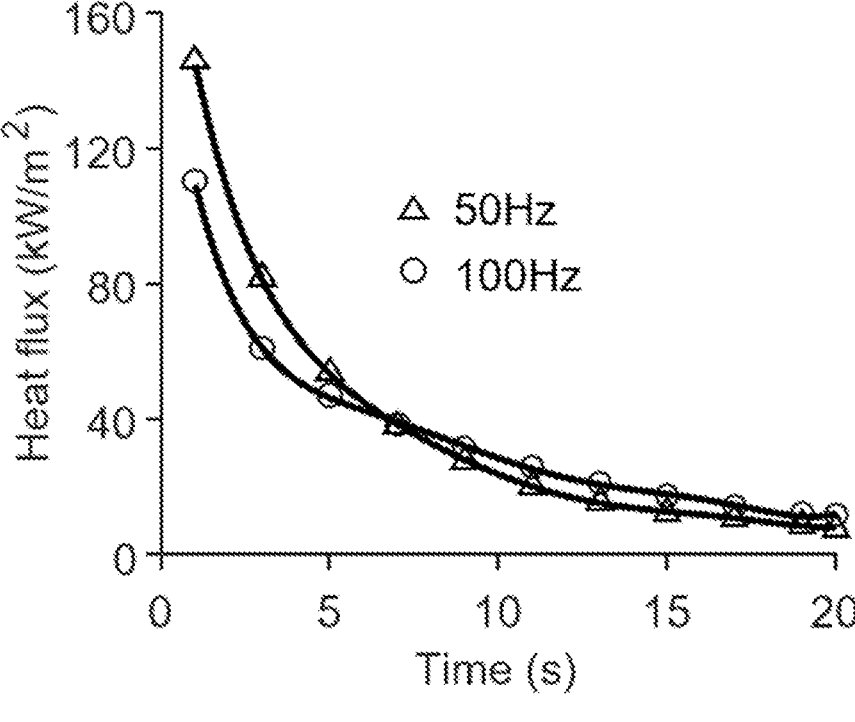

FIGS. 3A-3J provide an illustration of the deposition of water droplets onto a stationary stage at different ejection frequencies. The computer control of the piezoelectric nozzle allowed the time interval between individual droplets to be accurately controlled. At 5 Hertz (Hz) ejection frequency, individual droplets froze before the subsequent droplet contacted onto the pillar, resulting in a striated print geometry (FIG. 3A). In contrast, droplets deposited at 50 Hz and 100 Hz produced pillars with continuous architecture and smooth surfaces (FIGS. 3B and 3C). Higher deposition frequencies resulted in ice geometries with larger diameters. The reduced heat flux at longer "cord" lengths (i.e., increased height for the vertical pillars) caused the pillar diameters to increase at a given droplet frequency (FIGS. 3D and 3G).

Producing a uniform-diameter pillar required compensation of the reduced heat flux by reducing the droplet frequency (increasing the time between subsequent droplets) as the pillar length grew. Modulating the droplet discharge frequency allowed for the width of the printed geometry to continuously vary within a broad size range (approximately 50-400 μm).

To determine the droplet frequency required to print the desired pillar diameter, the dynamics of the freezing process were considered. For the layered deposition at 5 Hz, the mass of the ice structure was equal to the total deposited water mass (up to a certain height) since each droplet froze before the next one arrived. At higher deposition frequencies, the volume of the liquid pool was calculated from the difference between the total deposited mass and the mass of the ice. The reduced heat flux at longer pillar lengths affected the droplet frequency needed to produce a required width. For example, at sufficiently long pillar heights, 5 Hz frequency also produced continuous structures with smooth surfaces (FIG. 3I). The heat flux at the freeze front was calculated using the instantaneous freezing rate and freeze front diameter and decrease with time was observed as the front propagated along the cord length due to the thermal gradient (FIG. 3G). The volume of the liquid pool directly correlated with the resulting ice pillar diameters post-freezing. To achieve a desired constant pillar diameter, the droplet ejection frequency was modulated to keep the liquid pool volume constant, accounting for the reduction in heat flux at the freeze front with increasing height. As an example, linearly reducing droplet ejection frequency from 100 Hz to 5 Hz resulted in a pillar with a constant 170 μm diameter (FIGS. 3H-3I).

Repeatability of the 3D-ICE approach: A repeatability/reproducibility analysis was performed on fabricated ice pillars. First, 25 pillars with 100 μm target diameter size were fabricated and their widths were measured from the images. The measurement approach may have 1-2 μm uncertainty arising from the wavelength of the visible light and the lighting conditions/light reflections from the ice pillars. The 25 pillars were fabricated in batches of 5; thus, the statistics included both repeatability and reproducibility of the process. A histogram of the resulting data was generated and a normality test was conducted. The results indicated that the variation in diameter followed a normal distribution, with an average width (diameter) of 102 μm and a standard deviation of 4 μm.

Shape control using X-Y stage motions: The print geometry was determined to be dictated primarily by the X-Y stage motions during printing. Using controlled stage motions coordinated with the droplet dispensing allowed for the printing of ice forms with complex geometries, such as steep overhang angles or arch-type structures. The precise synchronization of stage motions and droplet dispensing allows for 3D-ICE printing without sacrificial support structures.

FIGS. 4A-4H demonstrate the fabrication of angled and curved ice structures using stage motions coordinated with droplet ejection. The local slope of the resulting structures depended primarily on the ratio of the stage speed and the rate of growth of the freezing front. For a given droplet frequency, increasing the speed of the X-Y stages produced geometries with steeper angles. When the X-Y stage moved between sequential droplets, the resulting off-axis deposition of the incoming droplets produced a local inclination. This resulted in a gradual rotation of the freeze front in the deposition direction. However, excessive stage displacements between subsequent droplet ejections (as caused by large stage velocities) resulted in the approaching droplet to miss the liquid cap and deposit onto the platform, starting a new pillar (FIG. 4A(E)). Each pillar was printed in approximately 3.5 seconds. The ratio between the stage translation and freeze-front growth speed determined the heading angle (angle between the pillar growth direction and vertical) of the freeze front. The faster that the stage moved relative to the freeze-front growth, the steeper the heading angle. The pillars in FIG. 4A got progressively steeper as the ratio between the stage and freeze front propagation speeds increased with time.

Figures 4F, 4G:
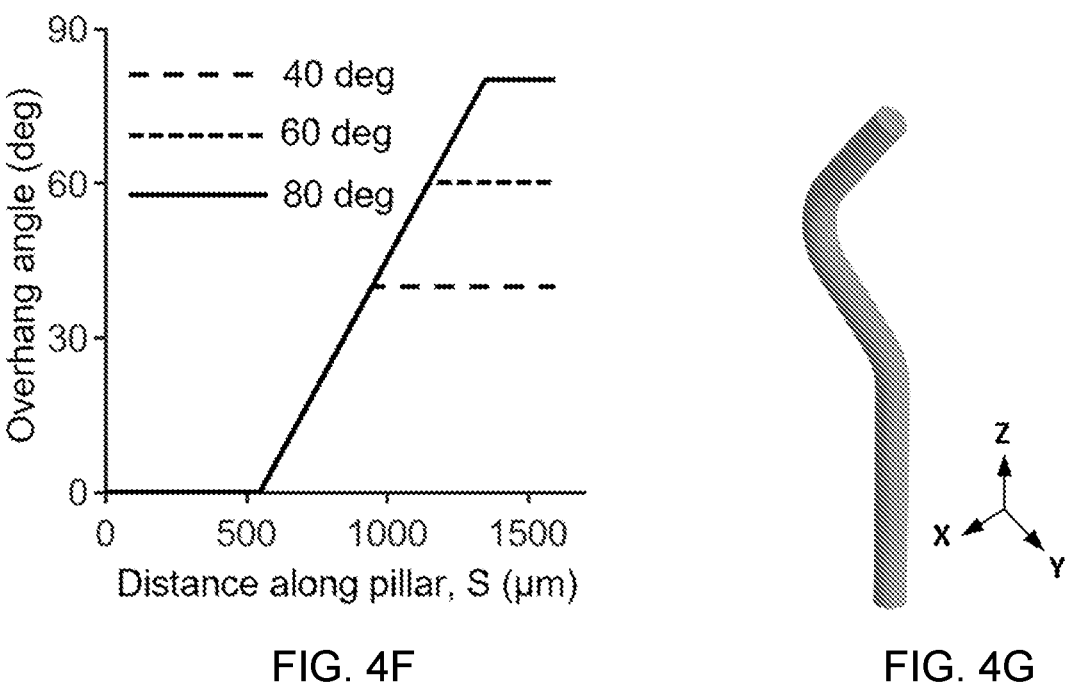
Figure 4H:
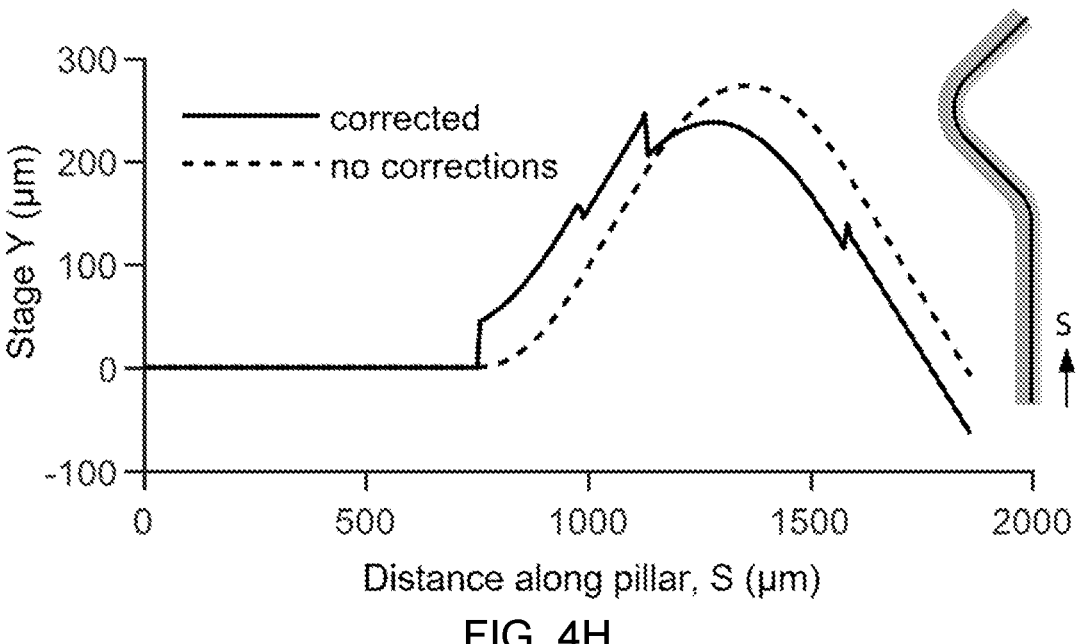
Figure 4I:
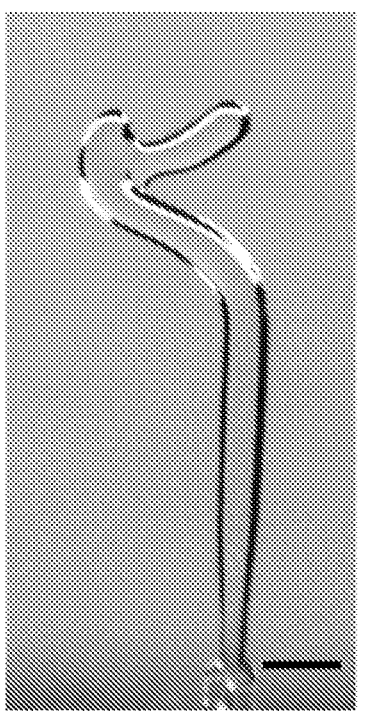
Figure 4I:
Figure 4J:
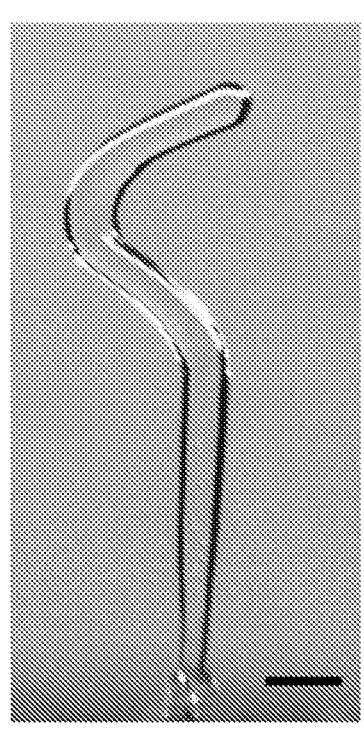

At a given pillar length, the rate of the freeze front rotation depended on the offset of the incoming droplet from the heading axis at the pillar tip (FIG. 4B). This information was used to generate stage motion trajectories to print inclined and curved geometries. This approach formed the basis for printing more complex shapes. To print a given curved shape, the print path was generated by adding a correction factor to the centerline of the geometry. For the zigzag structure in FIG. 4G, moving the stage along the centerline (dashed line of FIG. 4H) resulted in an inaccurate print geometry (FIG. 4I). To compute the correction factor, the rate of change of the slope along the length of each branch of the print geometry was calculated. The correction factor was then calculated as an offset from the centerline using the inverse of the experimentally determined function from FIG. 4B. Using this correction based on the curvature of the geometry (solid line of FIG. 4H) on the print path enabled the successful fabrication of the desired form (FIG. 4J). At this size scale, gravitational forces did not play a significant role, and surface tension allowed the liquid droplet cap to tightly adhere to the ice pillar even at very steep angles. Using 3D-ICE, the printing of inclined pillars with overhangs as steep as 80 degrees (measured from the vertical) was demonstrated (FIGS. 4E and 4F).

Figure 5C:
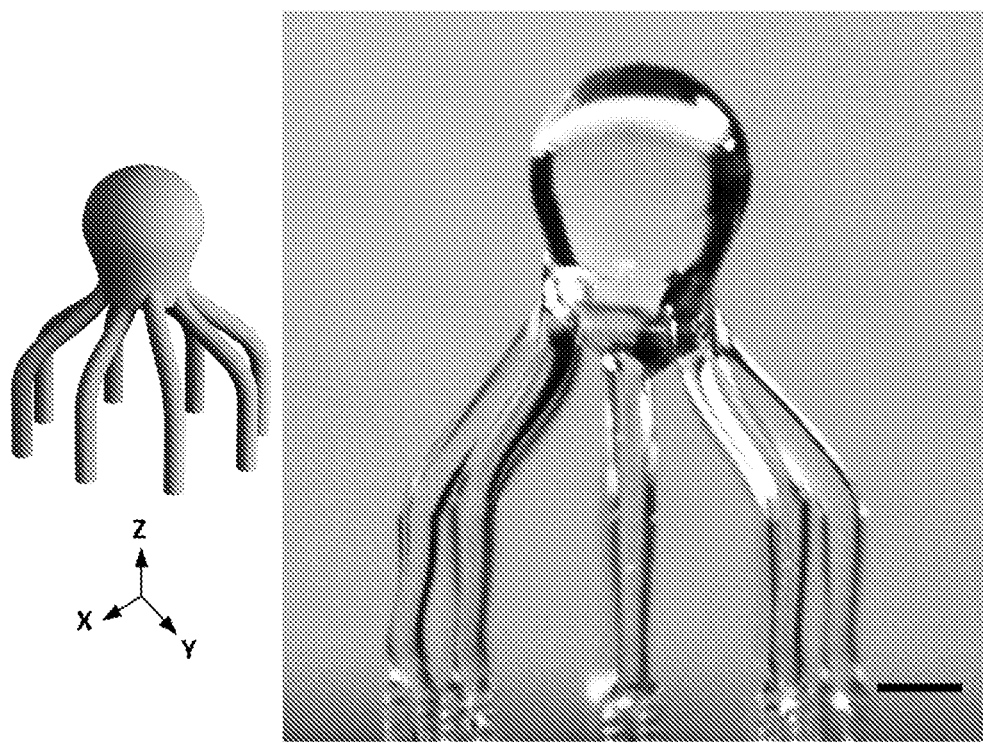

Printing of complex three-dimensional ice structures: Three designs were fabricated to demonstrate the features of smooth cylindrical surfaces, sections with varying diameters, and branched structures with smooth transitions between the branches. FIGS. 5A-5C shows three different three-dimensional models: a helical coil with an independent central pillar, a branched tree-like structure, and a microscale octopus sculpture. Based on the computer aided design (CAD) model of the geometry, a print code was generated that specified the time-dependent droplet ejection frequencies and the associated X-Y stage motions. In most cases, the stage remained stationary during droplet ejection, and stage motions occurred in the time interval between the ejections of individual drops. For these prints, the nozzle Z-height was held constant. The droplet deposition frequencies for the prints ranged from 5 Hz to 300 Hz, and the structures of FIGS. 5A-5C were printed in 43 seconds, 38 seconds, and 57 seconds, respectively.

For the helical coil, the helix structure was first printed in one continuous step, followed by the thinner central pillar (FIG. 5A).

Figure 5D:
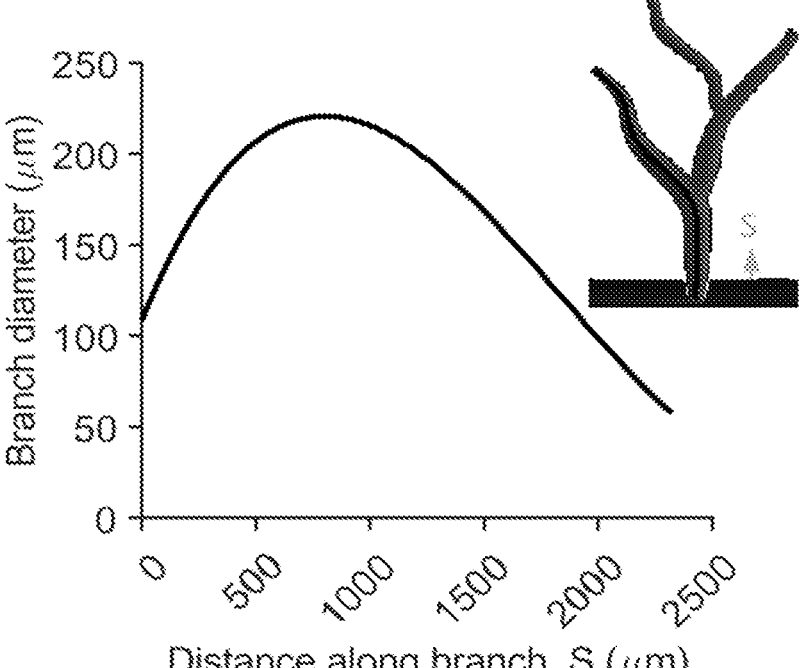
Figure 5E:
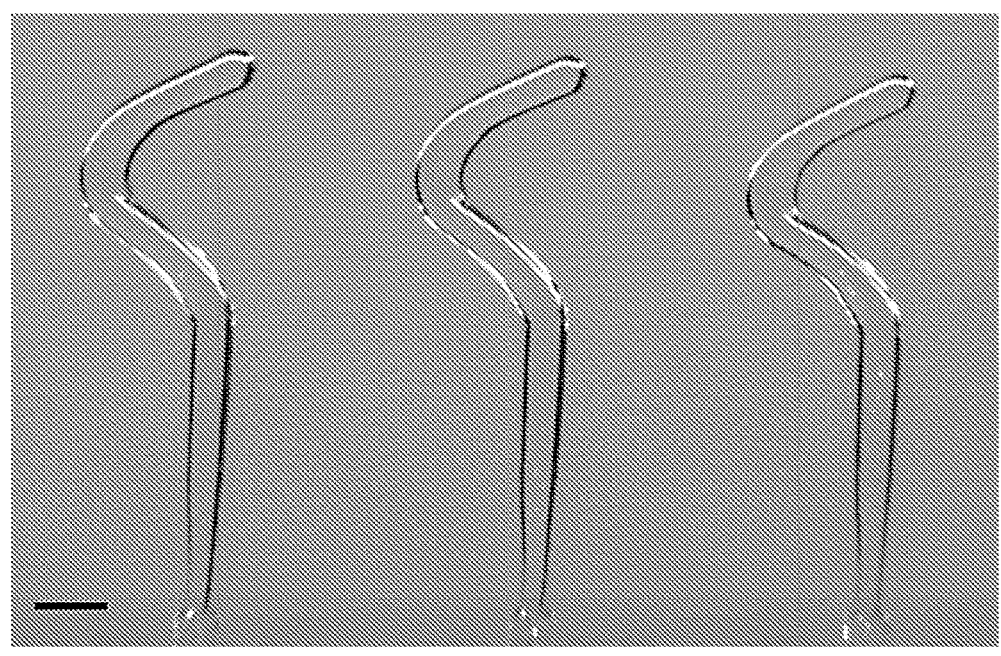

For the branching structure, the main branch (trunk) anchoring the tree to the build surface was printed first, followed by the thicker branch and the thinnest branch. The branch thickness was varied along the length by systematically varying droplet deposition frequency (FIGS. 5B and 5D). At any given time instant, if the deposition rate exceeded the freezing rate, the diameter of the ice pillar started to increase. To obtain a smooth transition from the trunk to a branch, multiple droplets were deposited side by side. The tree-like geometry demonstrated a hierarchically branched structure with smooth surfaces and transitions, and continuously varying diameters.

The octopus ice sculpture was printed in nine steps, with the eight legs printed first. After printing all eight legs (one at a time with varied orientations), the head/main body was fabricated by depositing droplets when the stage was moving (FIG. 5C).

Example 3—Reverse Molding of Printed Three-Dimensional Ice Templates

3D-ICE was used to fabricate sacrificial templates. Such ice templates were used for reverse molding, i.e., to create internal (negative) channels and other void features in a solid (positive) part (Wilson et al. "Fabrication of circular microfluidic channels by combining mechanical micromilling and soft lithography", *Lab on a Chip*, 2011, 11:1550-1555).

Figure 6A:
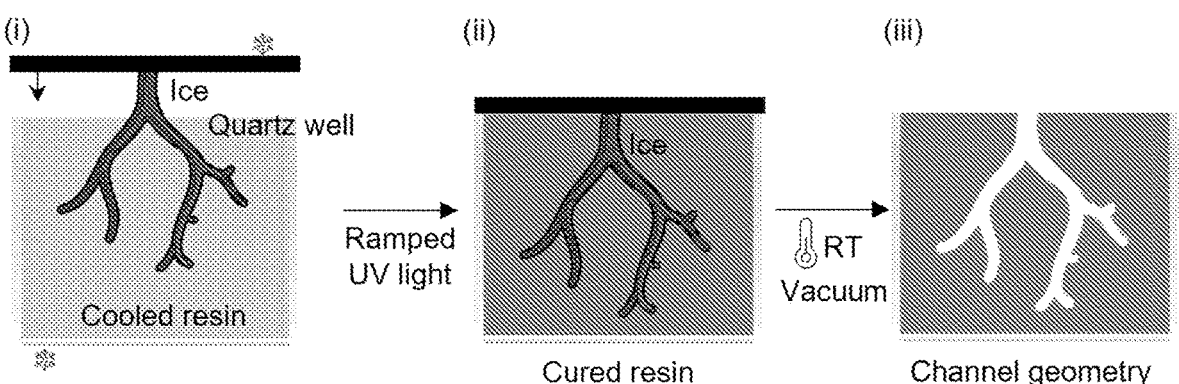

FIG. 6A depicts the process reverse molding channel geometries by casting a UV-curable resin around the 3D ice templates. Printed ice templates were submerged into a UV-curable resin (Henkel Loctite 3971 Ellsworth Adhesives Germantown, WI, USA) using an automated mechanism. The resin was first cooled down to −15° C. to prevent the melting of the ice templates; the resin remained liquid at this temperature. The motion was achieved using the same 3-axis stages used for the printing process. The copper print plate had cylindrical neodymium magnets attached to it for the arm to grab, lift and flip the plate. To release the plate from the stage and allow the arm to lift it, the vacuum from the chuck was released before the lifting step. The resin was pre-chilled using a second Peltier device mounted on the cooled copper stage to prevent melting of the templates before curing.

Figure 6B:
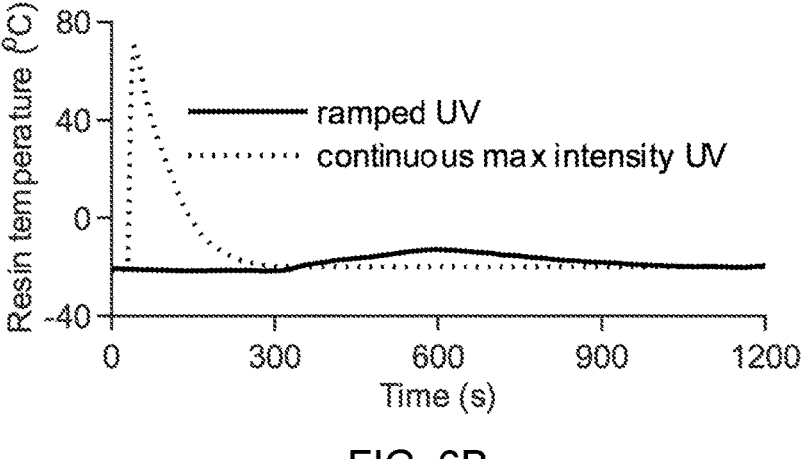
Figure 6F:
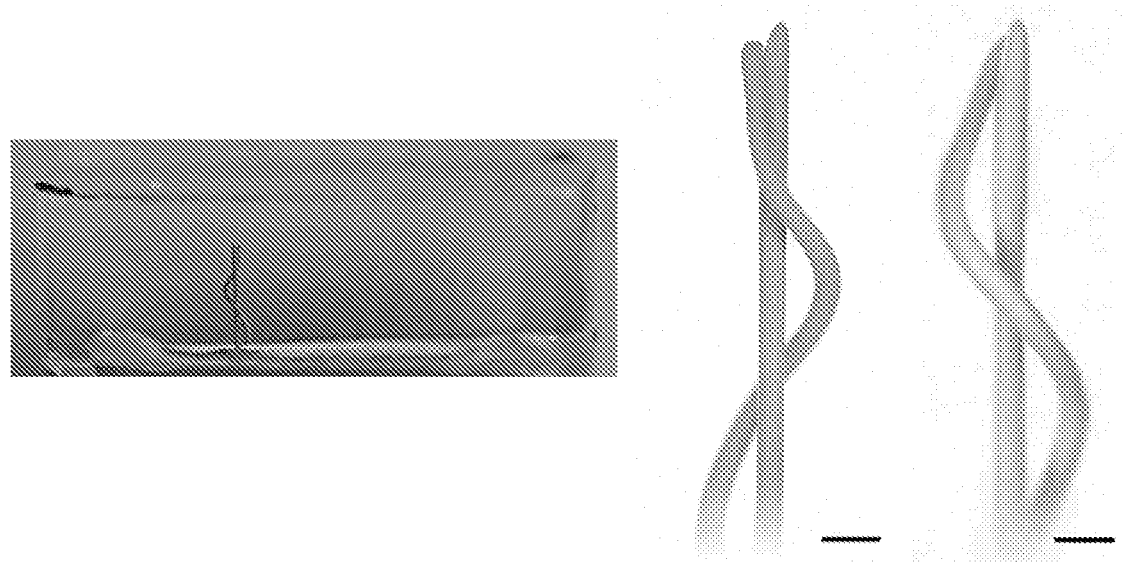

The resin was contained inside a custom-fabricated well with quartz walls (Technical Glass Products, Inc. (TGP), Painesville Twp., OH, USA) and a thin aluminum base. The high level of transparency of the quartz glass at the ultraviolet (UV) wavelength facilitated efficient curing of the contained resin and clear optical imaging post-fabrication. The encapsulation process was observed with a microscope camera (Dunwell Tech Dino-Lite, Torrance, CA, USA) with a wide field of view. The resin was cured for 20 minutes using a high power 400-410 nm ultraviolet LED (LED Supply, Randolph, VT, USA) controlled by an LED driver (LED Supply). The UV light intensity was ramped up slowly to prevent excessive exotherms inside the resin, which maintained the temperature of the encapsulant well below the melting temperature of ice (FIG. 6B). After curing the encapsulating resin, the constructs were brought up to room temperature to melt the encased ice. The liquid water was evacuated from the channels using vacuum. The resulting void space was then filled with an orange-colored opaque stain (Microfil MV-117, FlowTech Inc., Boulder, CO) using a vacuum filling process. The resulting constructs were imaged using a digital microscope (VHX-5000, Keyence America, USA) under a combination of ring and coaxial illumination.

After curing the resin, the water was removed leaving behind the final positive geometry with well-defined internal features and conduits that replicated the printed ice geometries (FIGS. 6C-6F).

A repeatability study was performed for the inverse molding process. Five ice pillars with nominally the same diameter (100 μm) and spacing (500 μm) were fabricated and used to create internal channels in UV-curable resin. The average internal channel diameter was measured as 98 μm with a standard deviation of 3 μm. The spacing between the channels was measured as 507 μm with a standard deviation of 5 μm.

Example 4—Ice Printing for Vascularized Tissue Engineering

A three-dimensional ice printing technique was developed to create tissue scaffolds with biomimetic three-dimensional vasculature networks. In the process, a high-resolution three-dimensional vascular template with relevant diameters and branched structures was printed from water using 3D-ICE.

Materials and Methods

Figures 7A, 7B, 7C:
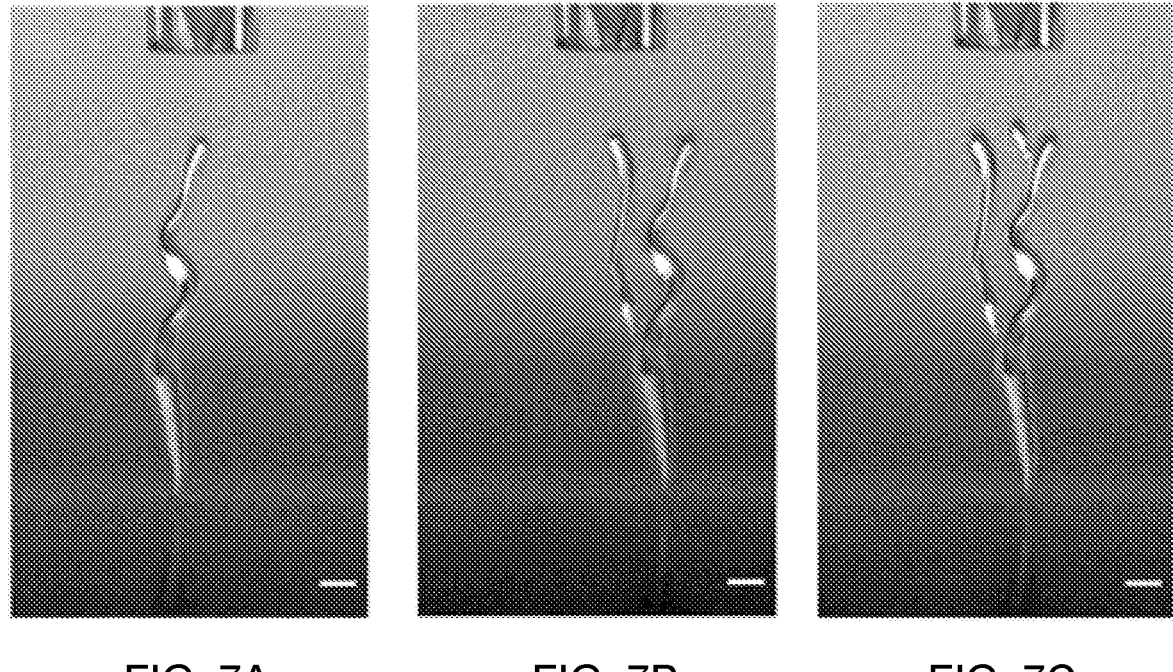
FIGS. 7A-7D are photographs of the printing process for a high-resolution hierarchical curvilinear branched ice vasculature templates.
Figure 7D:
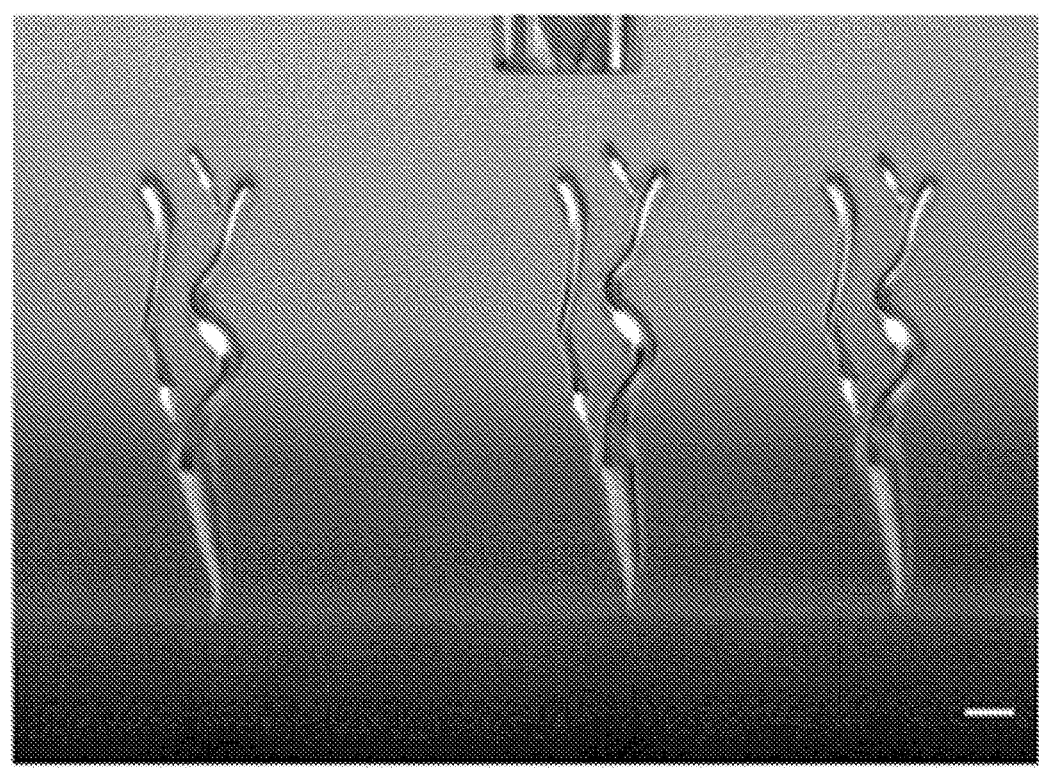

Fabrication of vasculature-like ice structures: A design with smooth surfaces, sections with different diameters, and a branched structure with smooth interconnects between the branches was chosen. A preliminary characterization to relate droplet frequency to the print diameter was completed. Based on preliminary characterization, a computer code to print the selected geometry was created. The three-dimensional ice printing system described in Example 1 was utilized. The printing progression of the ice structure can be found in FIGS. 7A-7C. The printed templates had smooth walls, gradual transitions between sections of different vessel diameters, and a biomimetic branched structure. Reproducibility of the process was demonstrated by the copies of the same printed design (FIG. 7D).

Figure 8A:
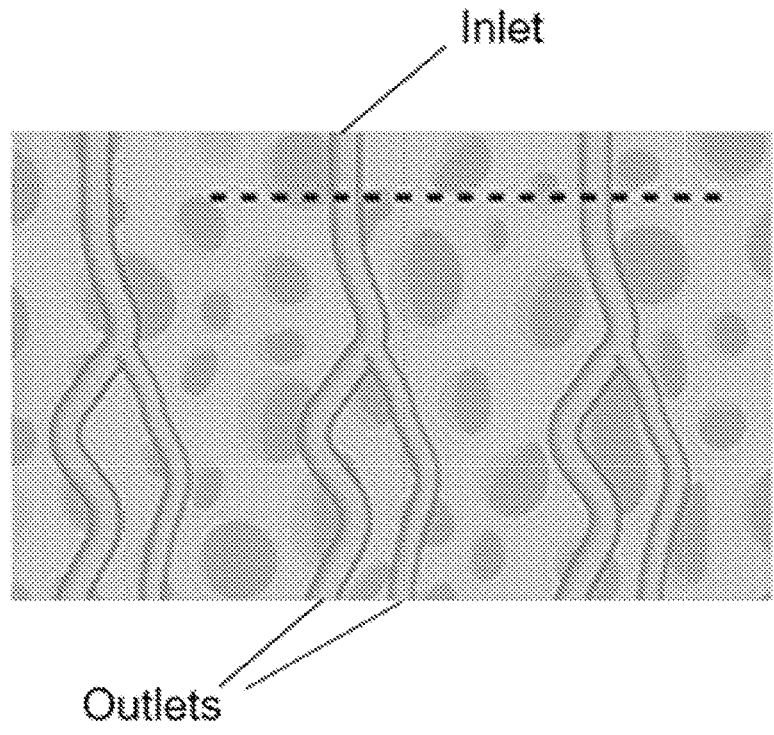
FIGS. 8A-8B depict vascular channels created by the printing process.
Figures 8B, 9:
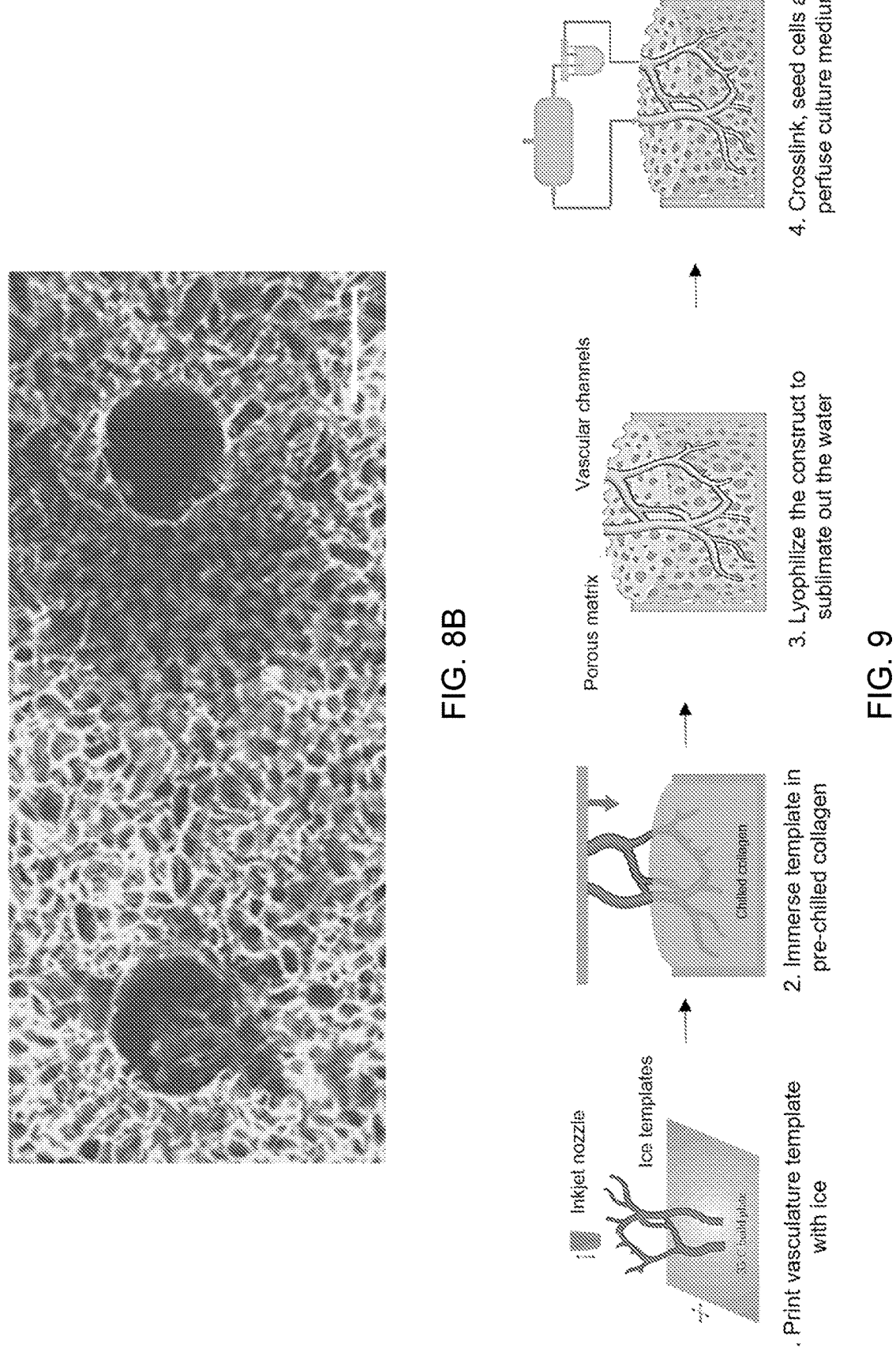
FIG. 9 is an overall schematic of the process for creating vascularized tissue scaffolds using 3D ice printing.

Embedding vasculature templates into chilled collagen and lyophilization: After printing, the ice templates were submerged into a pre-cooled Type I collagen (C9879 Sigma-Aldrich, St. Louis, MO) suspension (0.75 weight/volume (wt/v) %) in a mixture of ethanol and deionized water (25:75 volume/volume (v/v), pH adjusted to 2.8 using acetic acid) maintained at a temperature of −10° C. The suspension was chilled to below 0° C. to prevent the ice templates from melting and the ethanol in the collagen suspension prevented the suspension from freezing at −10° C. After immersing the templates to the desired depth, the entire construct was cooled to −35° C., which froze the ice templates in place and embedded them inside the frozen collagen. The frozen constructs were then lyophilized to sublimate out the water, leaving behind a porous collagen matrix with well-defined vasculature conduits from the three-dimensional printed ice templates (FIGS. 8A and 8B). The scaffolds were then subsequently crosslinked, seeded with cells, and cultured under cell culture medium perfusion. A schematic of the process can be found in FIG. 9.

The scaffold was imaged using fluorescence microscopy. Scaffolds were prepared with fluorescein sodium salt added to the collagen suspension. The lyophilized scaffolds were imaged dry using a Carl Zeiss LSM 880 confocal microscope, where both collagen porosity and the well-defined circular cross-sections of vasculature conduits were observed (FIGS. 8A and 8B).

Results and Discussion

Printing parameter effect on fabricated ice templates: In addition to the nozzle size, platform temperature, and stage motions, the print geometry was dictated by the print frequency (i.e., the frequency of droplets supplied from the nozzle). At a low frequency, the droplets froze on the print surface before the next droplet arrived producing an undesirable stepped printing pattern. When the droplets were ejected at a sufficiently high frequency, a very small and stable pool of water steadily froze from the bottom, formed, and remained on the printing target. The size of the pool increased as the print frequency increased. This finding was used to modulate droplet ejection frequency to change the thickness of the printed geometry. Low frequencies resulted in thin geometries with diameters approximately equal to the nozzle size, while higher frequencies produced thicker geometries. With the small droplet size from the inkjet nozzle, surface tension forces enabled the incoming droplets to stick tightly to the previously printed construct which allowed the printing of curved or overhang geometries without a support material. An overhang of up to 75 degrees was achieved. The motion of the X-Y axis stage was used to control the angles of these overhangs while controlling the flow rate of water.

Having described this invention above, it will be understood to those of ordinary skill in the art that the same can be performed within a wide and equivalent range of conditions, formulations and other parameters without affecting the scope of the invention or any embodiment thereof.

The invention claimed is:

1. A method of forming a three-dimensional structure using droplet-based freeform printing comprising:
   depositing a structural material while in a liquid phase through one or more nozzles onto a surface of a substrate by droplet-based freeform printing to form one or more three-dimensional structures comprising one or more cross-sectional dimensions, the structural material changing from liquid to solid form while printing to form the one or more three-dimensional structures;
   controlling a droplet ejection frequency while depositing the structural material to form a three-dimensional structure of the one or more three-dimensional structures such that the three-dimensional structure is formed from droplets ejected at different frequencies, wherein the structural material undergoes a liquid-to-solid transition after deposition of the structural material, and wherein the droplet ejection frequency is controlled such that the liquid-to-solid transition of a droplet of the structural material does not undergo a complete liquid-to-solid transition before a subsequent droplet of the structural material is deposited; and
   controlling an overhang angle or growth heading angle of the three-dimensional structure by controlling an X-Y speed of the one or more nozzles or the substrate while depositing the structural material to produce off-axis droplets that rotate a freeze-front of the three-dimensional structure,
   wherein the one or more cross-sectional dimensions are controlled by the droplet ejection frequency.

2. The method of claim 1, wherein the droplet ejection frequency is controlled between 1 Hertz (Hz) to 900 Hz.

3. The method of claim 1, wherein the one or more three-dimensional structures comprise a branched shape and/or a curvature.

4. The method of claim 3, wherein the one or more three-dimensional structures comprise a curvature and the curvature is controlled by moving the substrate and/or by moving the one or more nozzles while the structural material is deposited,
   wherein the one or more nozzles and the substrate move relative to each other.

5. The method of claim 1, wherein the one or more nozzles comprise a diameter of from 1 micron to 1,000 microns.

6. The method of claim 1, wherein the liquid-to-solid transition is a phase transition, such as freezing, or solidification.

7. The method of claim 1, wherein the structural material comprises water, an aqueous solution, camphene, or combinations thereof.

8. The method of claim 1, wherein the structural material comprises a metal alloy, such as eutectic gallium indium (EGaIn) or Galinstan.

9. The method of claim 7, wherein the structural material further comprises cell response factors, proteins, metabolites, salts, sugars, glycoconjugates, coloring agents, an electrically conductive material, water, an environmental linking agent, or any combination thereof.

10. The method of claim 9, wherein the structural material further comprises an electrically conductive material comprising carbon nanotubes, graphene oxide, MXenes, metal nanoparticles, or any combination thereof.

11. The method of claim 1, wherein the one or more three-dimensional structures comprise ice.

12. The method of claim 1, wherein the substrate is above 25° C., at least 25° C., at least 10° C., at least 0° C., at least −10° C., at least −20° C., at least −35° C., or below −35° C. while depositing the structural material.

13. The method of claim 1, wherein the one or more three-dimensional structures comprise a vascular geometry.

14. The method of claim 1, further comprising coating at least a portion of the one or more three-dimensional structures with a coating composition.

15. The method of claim 14, wherein the coating composition comprises an elastin-collagen hydrogel, alginate, hyaluronic acid, gelatin, agarose, chitosan, cellulose, poly(acrylic acid), poly(vinyl alcohol), poly(ethylene glycol), poly(ethylene oxide), poly(N-isopropylacrylamide), silicone, or a combination of two or more of any of the preceding.

16. The method of claim 1, wherein a subsequent droplet of the structural material is deposited offset from previously deposited droplets of the structural material to form a non-circular cross-sectional shape, such as an oval-shaped cross-section, a super ellipse-shaped cross section, or a circular triangle-shaped cross section.

17. The method of claim 1, wherein the three-dimensional structure is a negative three-dimensional template.

18. The method of claim 1, further comprising spot-heating, e.g., with a laser, a portion of the deposited structural material to modulate the rate of solidification, melt, or ablate at least a portion of the deposited structural material.

19. A method of fabricating a matrix comprising a three-dimensional structure, comprising:

forming a negative three-dimensional template using droplet-based freeform printing, wherein forming the negative three-dimensional template comprises:

depositing a structural material through one or more nozzles onto a surface of a substrate by droplet-based freeform printing to form the negative three-dimensional template as one or more three-dimensional structures comprising one or more cross-sectional dimensions, the structural material comprising: water, an aqueous solution, camphene, or combinations thereof; and controlling a droplet ejection frequency while depositing the structural material to form a three-dimensional structure of the one or more three-dimensional structures such that the three-dimensional structure is formed from droplets ejected at different frequencies, wherein the structural material undergoes a liquid-to-solid transition after deposition of the structural material, wherein the one or more cross-sectional dimensions are controlled by the droplet ejection frequency, and wherein the droplet ejection frequency is controlled such that the liquid-to-solid transition of a droplet of the structural material does not undergo a complete liquid-to-solid transition before a subsequent droplet of the structural material is deposited;

depositing a matrix material over the negative three-dimensional template and at least a portion of the surface of the substrate; and solidifying the matrix material to form a matrix comprising the one or more three-dimensional structures of the negative template.

20. The method of claim 1, wherein the droplet-based freeform printing comprises inkjet printing.

21. The method of claim 19, wherein the droplet-based freeform printing comprises inkjet printing, and wherein depositing the matrix material over the negative three-dimensional template and the at least a portion of the surface of the substrate comprises casting the matrix material over the negative three-dimensional template and the at least a portion of the surface of the substrate.

22. A method of forming a three-dimensional structure using droplet-based freeform printing comprising:

depositing a structural material through one or more nozzles onto a surface of a substrate by droplet-based freeform printing to form one or more three-dimensional structures comprising a three-dimensional structure having different cross-sectional dimensions, the structural material comprising (i) water, an aqueous solution, camphene, or any combination thereof, and (ii) carbon nanotubes, graphene oxide, MXenes, metal nanoparticles, or any combination thereof, wherein the structural material undergoes a liquid-to-solid transition after deposition of the structural material, wherein the different cross-sectional dimensions are controlled by modulating a droplet ejection frequency while forming the three-dimensional structure, wherein the droplet ejection frequency is controlled while depositing the structural material such that a liquid-to-solid transition of a droplet of the structural material does not undergo a complete liquid-to-solid transition before a subsequent droplet of the structural material is deposited.

* * * * *